United States Patent
Murade

(10) Patent No.: US 7,061,567 B2
(45) Date of Patent: Jun. 13, 2006

(54) ELECTRO-OPTICAL DEVICE WITH A PLURALITY OF FIRST AND SECOND SETS OF FRAME SHIELDING FILMS THAT DEFINES THE IMAGE DISPLAY REGION

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/259,390

(22) Filed: Sep. 30, 2002

(65) Prior Publication Data

US 2003/0076459 A1   Apr. 24, 2003

(30) Foreign Application Priority Data

Oct. 4, 2001 (JP) ............... 2001-309103
Sep. 10, 2002 (JP) ............... 2002-264521

(51) Int. Cl.
*G02F 1/1345* (2006.01)
*G02F 1/1333* (2006.01)

(52) U.S. Cl. ............ 349/151; 349/110; 349/111
(58) Field of Classification Search ......... 349/151, 349/110–111
See application file for complete search history.

(56) References Cited

U.S. PATENT DOCUMENTS

| 5,247,375 | A | * | 9/1993 | Mochizuki et al. ........... 349/84 |
| 5,574,292 | A | * | 11/1996 | Takahashi et al. ............ 257/59 |
| 5,739,880 | A | * | 4/1998 | Suzuki et al. ............... 349/110 |
| 5,777,594 | A | | 7/1998 | Miyawaki |
| 6,081,305 | A | * | 6/2000 | Sato et al. .................... 349/5 |
| 6,084,579 | A | * | 7/2000 | Hirano ....................... 345/205 |
| 6,097,457 | A | * | 8/2000 | Kim et al. .................. 349/110 |
| 6,157,429 | A | * | 12/2000 | Miyawaki et al. ......... 349/138 |
| 6,175,395 | B1 | * | 1/2001 | Yamazaki et al. ........... 349/44 |
| 6,184,962 | B1 | * | 2/2001 | Suzuki et al. .............. 349/143 |
| 6,249,333 | B1 | * | 6/2001 | Zhang et al. ............... 349/151 |
| 6,271,897 | B1 | * | 8/2001 | Ichikawa et al. ............ 349/43 |
| 6,330,044 | B1 | | 12/2001 | Murade |
| 6,392,622 | B1 | | 5/2002 | Ozawa |
| 6,396,470 | B1 | | 5/2002 | Zhang et al. |
| 6,545,731 | B1 | * | 4/2003 | Melnik et al. ............... 349/44 |
| 6,678,025 | B1 | * | 1/2004 | Iida et al. .................. 349/111 |
| 6,774,957 | B1 | * | 8/2004 | Jinno et al. .................. 349/40 |

FOREIGN PATENT DOCUMENTS

EP   1 132 765 A2   9/2001

(Continued)

OTHER PUBLICATIONS

Translation of JP 10-301100.*

*Primary Examiner*—Andrew Schechter
*Assistant Examiner*—Lucy P. Chien
(74) *Attorney, Agent, or Firm*—Oliff & Berridge, PLC

(57) ABSTRACT

An electro-optical device includes a display electrode disposed in an image display region of a TFT array substrate, a pattern portion including at least one of wiring and a circuit element connected to the display electrode directly or through a pixel switching element and provided in a frame region, which defines the periphery of the image display region, and a lower shielding film for covering the TFT array substrate side of at least a portion of the pattern portion. Therefore, in the electro-optical device such as a liquid crystal device, a light-dark pattern due to the wiring and the circuit element provided in the frame region can be prevented from being projected near the edge of a display image.

10 Claims, 14 Drawing Sheets

FOREIGN PATENT DOCUMENTS

| | | |
|---|---|---|
| JP | A 04-361229 | 12/1992 |
| JP | A 07-098459 | 4/1995 |
| JP | A-9-80480 | 3/1997 |
| JP | 10301100 A * | 11/1998 |
| JP | A-10-301100 | 11/1998 |
| JP | A 10-301100 | 11/1998 |
| JP | 11183934 A * | 7/1999 |
| JP | 11194360 A * | 7/1999 |
| JP | A-2000-275676 | 10/2000 |
| JP | A 2000-275676 | 10/2000 |
| JP | A-2001-100251 | 4/2001 |
| KR | 2001-0006366 | 1/2001 |

* cited by examiner

ELECTRO-OPTICAL DEVICE WITH A PLURALITY OF FIRST AND SECOND SETS OF FRAME SHIELDING FILMS THAT DEFINES THE IMAGE DISPLAY REGION

BACKGROUND OF THE INVENTION

1. Field of Invention

The present invention relates to an electro-optical device, such as a liquid crystal device or the like. More particularly, the invention relates to an electro-optical device including a frame shielding film which defines an image display region, and an electronic apparatus including the electro-optical device.

2. Description of Related Art

This type of electro-optical device includes an element array substrate on which display electrodes, such as pixel electrodes or striped electrodes, various wirings, such as data lines and scanning lines, switching elements, such as pixel-switching thin film transistors (hereinafter "TFT") or thin film diodes (hereinafter "TFD") are formed, and a counter substrate on which a counter electrode formed in stripes or formed over the entire surface, and a light shielding film are formed. The two substrates are disposed opposite to each other. Furthermore, an electro-optical material, such as a liquid crystal is sealed between the two substrates with a sealing material, and an image display region in which the display electrodes are arranged is located nearer to the center (i.e., a region of each substrate which faces the liquid crystal) than a seal region in which the sealing material is present. Particularly, in a plan view of the device (as viewed from the direction perpendicular to the image display region), the frame region of the image display region is defined as a frame shape along the inner line of the seal region by the same film as the shielding film provided on the counter substrate as described above.

A built-in peripheral circuit-type electro-optical device can also be provided in which peripheral circuits, such as a scanning line driving circuit, a data line driving circuit, a sampling circuit, an inspection circuit, etc., are formed in the frame region and the peripheral region in the periphery of the frame region of the element array substrate.

Therefore, wirings led from the image display region to the peripheral region are present in the frame region. Furthermore, when some of the peripheral circuits, such as the sampling circuit, and the like, which are connected to the wirings, are formed in the frame region, the circuit elements constituting some of the peripheral circuits are present in the frame region. Namely, a pattern including the wirings and the circuit elements is present in the frame region.

The electro-optical device having the above construction is contained in a light-shielding mounting case including a display window provided corresponding to the image display region so that the edge of the display window is positioned near the center line of the frame region.

SUMMARY OF THE INVENTION

However, in the above-described electro-optical device, the pattern including the wirings and the circuit elements which are present in the frame region of the element array substrate, is formed by patterning a conductive film, such as an Al film, or the like. Therefore, in a projector in which incident light has high strength and contains a large quality of oblique components, the incident light is reflected by the surface of the pattern portion or passes through spaces of the pattern portion according to the reflectance. The light reflected by the pattern portion is reflected by a frame shielding film of chromium (Cr) provided on the counter substrate. Furthermore, the internally reflected light reflected by the frame shielding film and the light passing through the pattern portion are reflected by the back of the element array substrate to produce reflected light (i), and the internally reflected light reflected by the frame shielding film and the light passing through the pattern portion are reflected by optical elements provided on the emission side of the electro-optical device, such as a polarizing plate, a retardation plate, dustproof glass, etc., to produce reflected light (ii). In a multi-substrate projector including a light valve including a plurality of electro-optical devices, light emitted from another electro-optical device passes through a synthetic optical system and is reflected by the pattern portion and the frame shielding film to produce internally reflected light (iii). These lights (i), (ii), and (ii) are finally mixed with emitted light to emit light from the electro-optical device.

Consequently, there is a problem in which a light-dark pattern (for example, light-dark fringe patterns when a plurality of wirings are arrayed) is projected near the edge of a display image corresponding to reflection from or transmission through the pattern portion. In addition, the surface of the pattern portion including the wirings and the circuit elements has unevenness corresponding to the unevenness of an under surface and the shape of the pattern itself. Therefore, internally reflected light reflected by the uneven surface produces a light-dark pattern by interference of light, and thus the light-dark pattern finally mixed in emitted light becomes further remarked according to the structure of the pattern portion.

In order to conceal the light-dark pattern projected by internal reflection from the wirings, a wide frame shielding film must be formed so as to define the frame region to be significantly wider than the region on the substrate on which the pattern portion to be concealed is present. Therefore, it is difficult to comply with the basic requirement for the electro-optical device to ensure as a wide image display region as possible on the limited region of the substrate. Furthermore, in consideration of the fact that the return light and the internally reflected light are reflected by the surface of the frame shielding film, which faces the element array substrate, and finally mixed as light having a light-dark pattern with emitted light, it is theoretically difficult to completely conceal the light-dark pattern by simply widening the frame shielding film.

The present invention addresses or solves the above-described problem, and provides an electro-optical device capable of preventing or substantially preventing a light-dark pattern due to a pattern portion including wirings and circuit elements provided on a frame region from being projected outside a display image, and various electronic apparatus each including the electro-optical device.

In order to address or achieve the above, in a first aspect of the present invention, an electro-optical device includes display electrodes arranged in an image display region of a substrate, a pattern portion including at least either of wiring and circuit elements connected to the display electrodes directly or through pixel switching elements and provided in a frame region, which defines the periphery of the image display region, and a lower shielding film to cover the substrate side of at least a portion of the pattern portion.

In the electro-optical device in the first aspect of the present invention, for example, wirings, such as data lines and scanning lines, are led from the image display region and arranged in the frame region. Besides the wirings or in addition to the wirings, transistors or circuit elements, such as TFTs or TFDs, which constitute at least some of peripheral circuits connected to the lead wirings, are arranged in the frame region. Therefore, image signals are supplied to the display electrodes such as pixel electrodes through the wirings and the circuit elements provided in the frame region, directly or through the pixel switching elements, such as TFTs, to permit active matrix driving or passive matrix driving.

Particularly, in application to a projector in which incident light has high strength and contains a large amount of oblique components, the incident light is reflected by the surface of the pattern portion, which is formed by patterning a conductive film, for example, including an Al film, or passes through spaces of the pattern portion according to the reflectance of the pattern potion. However, in the present invention, in a portion of the frame region, the substrate side of at least a portion of the pattern portion including the wirings and the circuit elements is covered with the lower shielding film. Therefore, of the incident light reflected by the pattern portion or passing through the spaces of the pattern portion, the quantity of light mixed with final emitted light for display directly or after internal refection is decreased by a quantity corresponding to the quantity of light absorbed or reflected by the lower shielding film. More specifically, in a multi-substrate projector, for internally reflected light resulting from further reflection of return light by the pattern portion and the frame shielding film, the quantity of the internally reflected light mixed with final emitted light for display is decreased by a quantity corresponding to the quantity of light absorbed or reflected by the lower shielding film.

Particularly, the surface of the pattern portion including the wirings and the circuit elements has unevenness corresponding to the unevenness of the lower surface or the shape of the pattern itself, and thus internally reflected light reflected by the uneven surface has a light-dark pattern due to interference of light. However, the light-dark pattern can be decreased by absorption or reflection by the lower shielding film.

As described above, in the electro-optical device of the present invention, the light-dark pattern projected outside the display image due to the pattern portion including the wirings and the circuit elements provided in the frame region can be decreased. Therefore, the frame shielding film need not be widened to conceal the light-dark pattern projected near the edge of the display image, thereby securing the wide image display region in the limited region on the substrate.

In addition, in the electrode-optical device of the present invention, the lower shielding film is provided on a portion facing the pattern portion, not provided over the entire frame region, and thus the occurrence of stress can be decreased as compared with a case in which the lower shielding film is formed over the entire frame region.

In the electro-optical device in the first aspect of the present invention, the frame shielding film is provided above the pattern portion in the frame region.

In this case, for example, the frame shielding film includes a built-in shielding film formed on the substrate, or a shielding film formed on the counter substrate opposing the substrate through the electro-optical material, such as the liquid crystal, and the frame region can be defined by the frame shielding film provided above the pattern portion. Particularly, the light-dark pattern projected outside the display image by internally reflected light reflected by the inner plane of the frame shielding film according to the pattern portion can be decreased by the lower shielding film displayed below the pattern portion.

In the electro-optical device in the first aspect of the present invention, the lower shielding film is provided on the flat surface of the substrate directly or through a flat underlying insulating film.

In this case, the lower shielding film is formed provided on the flat surface of the substrate directly or through the flat underlying insulating film, and thus the surface of the lower shielding film has substantially no unevenness. Therefore, even if return light from the back side of the substrate and internally reflected light are partially reflected by the lower shielding film, and mixed with final emitted light for display, the light-dark pattern due to interference can be decreased because light reflected by the flat lower shielding film has less interference.

In the electro-optical device in the first aspect of the present invention, the circuit elements include first transistors, and each of the display electrodes includes a pixel electrode. The electro-optical device further includes second transistors connected as the pixel switching elements to the pixel electrodes, the wirings being connected to the second transistors.

In this case, image signals are supplied to the second transistors through at least some of the peripheral circuits, for example, such as a sampling circuit, a scanning line driving circuit, a data line driving circuit, an inspection circuit, a pre-charge circuit, etc., all of which are arranged in the frame region and include the first transistors. Switching of the pixel electrodes is controlled by the second transistors to permit active matrix driving.

In the electro-optical device in the first aspect of the present invention, the same film as the lower shielding film is provided below the channel region of each of the second transistors.

In this case, the lower side of the channel region of each of the second transistors serving as the pixel switching elements respectively connected to the pixel electrodes is covered with the lower shielding film, and it is thus effectively prevent or substantially prevent the phenomenon that return light is incident on the channel regions to produce a light leakage current, preventing or substantially preventing a change in the characteristics of the second transistors. Incident light incident on the channel regions of the second transistors from above may be cut off by the built-in film formed on the substrate, the wirings including an Al shielding film or the like, and the shielding film provided on the counter substrate, without or substantially without any problem. Particularly, the lower shielding film to shield the second transistors in the pixel region and the lower shielding film to prevent or substantially prevent the occurrence of the light-dark pattern in the frame region include the same film, and can thus be formed by the same production step, thereby simplifying the laminated structure on the substrate and the manufacturing process.

In the electro-optical device in the first aspect of the present invention, the lower shielding film includes a light-absorbing film.

In this case, when return light is incident on the surface of the substrate-side surface of the lower shielding film, reflected light is decreased by absorption by the lower shielding film. Therefore, even when the reflected light is finally mixed with emitted light for display, the light-dark pattern based on the reflected light can be decreased.

In this case, the light-absorbing film may contain at least one of a polysilicon film and a high-melting-point metal film.

In this construction, the light-absorbing film having an excellent light-absorbing function can relatively easily be formed.

In the electro-optical device in the first aspect of the present invention, the lower shielding film is formed in an island-like shape.

In this case, the lower shielding film is formed in separated islands, and thus the occurrence of stress due to the presence of the lower shielding film can be reduced to enhance manufacturing yield and reliability of the device, as compared with a case in which the lower shielding film is formed over the entire frame region.

In the electro-optical device in the first aspect of the present invention, the lower shielding film may include a conductive film.

In this case, the lower shielding film includes the conductive film, and can thus be used not only as the shielding film, but also as the wiring or the like.

When the lower shielding film includes the conductive film, a fixed potential may be supplied to at least a portion of the lower shielding film.

In this construction, it is possible to prevent or substantially prevent a variation in the potential of the lower shielding film from adversely affecting the wirings and the circuit elements in the frame region.

Alternatively, when the lower shielding film includes the conductive film, at least portions of the lower shielding film, which are deposited below the first transistors, have a floating potential.

In this construction, the portions of the lower shielding film, which are deposited below the first transistors, have a floating potential, and it is thus possible to effectively prevent or substantially prevent a variation in the potential of the lower shielding film from adversely affecting the characteristics of the first transistors.

In this case, the portions of the lower shielding film, which are deposited below the first transistors, may be formed to include island-like portions which separate the portions of the lower shielding film, which face the source electrodes of the first transistors, from the portions of the lower shielding film, which face the drain electrodes of the first transistors.

In this construction, the island-like portions of the lower shielding film separate the portions of the lower shielding film, which face the source electrodes of the first transistors, from the portions of the lower shielding film, which face the drain electrodes of the first transistors, thereby decreasing capacitance coupling between the source electrodes and the drain electrodes due to the parasitic capacitance between the lower shielding film and the source electrodes, and the parasitic capacitance between the lower shielding film and the drain electrodes. Therefore, high transistor characteristics can be obtained from the first transistors.

When the lower shielding film includes the conductive film, at least the portions of the lower shielding film, which are deposited below the first transistors, may be formed to have slits which separate the portions of the lower shielding film, which face the source electrodes of the first transistors, from the portions of the lower shielding film, which face the drain electrodes of the first transistors.

In this construction, the slits of the lower shielding film separate the portions of the lower shielding film, which face the source electrodes of the first transistors, from the portions of the lower shielding film, which face the drain electrodes of the first transistors, thereby decreasing capacitance coupling between the source electrodes and the drain electrodes due to the parasitic capacitance between the lower shielding film and the source electrodes, and the parasitic capacitance between the lower shielding film and the drain electrodes. Therefore, high transistor characteristics can be obtained from the first transistors.

When the lower shielding film includes the conductive film, the lower shielding film may be formed so as not to be deposited below the channel regions of the first transistors.

In this construction, the lower shielding film is not disposed below the channel regions of the first transistors, and it is thus possible to effectively prevent or substantially prevent a variation in the potential of the lower shielding film from adversely affecting the characteristics of the first transistors.

When the lower shielding film includes the conductive film, at least the portions of the lower shielding film, which are deposited below the channel regions of the first transistors, may have the gate potential of the first transistors.

In this construction, the portions of the lower shielding film, which are deposited below the channel regions of the first transistors, have the gate potential of the first transistors, and the gate electrodes of the first transistors can be formed above the lower shielding film to form back channels by those portions of the lower shielding film. Therefore, the characteristics of the first transistors can be enhanced.

In the electro-optical device in the first aspect of the present invention, the lower shielding film is formed to extend from the outer edge of the image display region to the peripheral side by a predetermined width which is previously set according to the incidence angle of incident light applied to the frame region.

In this case, for example, in application to a projector for extended projection, the incidence angle of incident light applied to the frame region is increased, and the lower shielding film is formed to extend from the outer edge of the image display region to the peripheral side by the predetermined width previously set according to the incidence angle. Namely, in the frame region, the lower shielding film can be formed only in a region necessary to prevent the light-dark pattern according to the incidence angle.

However, in some cases, the effected of the present invention, i.e., the effect of preventing or substantially preventing projection of any image, which should not be basically displayed, outside the display image, cannot be sufficiently achieved only by the lower shielding film covering the pattern portion as described above. Namely, in the region outside the pattern formation region, i.e., in the region in which the wirings and the circuit elements are noted formed, there is no light shield, thereby allowing incident light to pass through that region. The passing light reaches the region outside the display image to project a dim light image around the display image, thereby possibly deteriorating the appearance of the image.

Therefore, in order to address or achieve the above, in a second aspect of the present invention, an electro-optical device includes display electrodes arranged in an image display region of a substrate, a pattern portion including at least either of wiring and circuit elements connected to the display electrodes directly or through pixel switching elements and provided in a frame region which defined the periphery of the image display region, a first lower shielding film to cover the substrate side of at least a portion of the pattern portion, and a second lower shielding film including the same film as the first lower shielding film and formed in the frame region except in the region when the pattern portion is formed.

In the electro-optical device in the second aspect of the present invention, for example, wirings, such as data lines and scanning lines, are led from the image display region and arranged in the frame region. Besides the wirings or in addition to the wirings, transistors or circuit elements, such as TFTs or TFDs, which constitute at least some of peripheral circuits connected to the led wirings, are arranged in the frame region. Therefore, image signals are supplied to the display electrodes, such as pixel electrodes through the wirings and the circuit elements provided in the frame region, directly or through the pixel switching elements, such as TFTs, to permit active matrix driving or passive matrix driving.

Particularly, in application to a projector in which incident light has high strength and contains a large amount of oblique components, as described above, the incident light is reflected by the pattern portion or passes through spaces of the pattern portion, and is then projected on an image, deteriorating the appearances of the image. Furthermore, in the region other than the pattern formation region, i.e., in the region in which the wirings and the circuit elements are not formed, there is no light shield, thereby allowing incident light to pass through that region.

However, in the present invention, the probability that light is reflected by the pattern portion or passing through the spaces of the pattern portion, and mixed with light for forming an image can be decreased by absorption or reflection by the lower shielding film. This is the same as described above with respect to the electro-optical device in the first aspect of the present invention. Particularly, in the present invention, the second lower shielding film is formed in the region in except the region where the pattern portion is formed, the passing light can be cut off, that is, the light can be absorbed or reflected by the second lower shielding film. Therefore, in the present invention, it is possible to prevent or substantially prevent the phenomenon that a dim light image appears around the display image, thereby displaying a high quality image with a good appearance.

In addition, the first lower shielding film and the second lower shielding film include the same film, thereby simplifying the manufacturing process or decreasing the manufacturing cost.

In order to address or achieve the above, in a third aspect of the present invention, an electro-optical device includes display electrodes arranged in an image display region of a substrate, a pattern portion including at least either of wiring and circuit elements connected to the display electrodes directly or through pixel switching elements and provided in a frame region which defined the periphery of the image display region, a lower shielding film to cover the substrate side of at least a portion of the pattern portion, an in-region shielding film including the same film as the lower shielding film and formed to cover the substrate sides of the channel regions of second transistors serving as the pixel switching elements, and an out-of-region shielding film including the same film as the lower shielding film and the in-region shielding film and formed in at least a portion of a peripheral region around the image display region, the peripheral region including the frame region.

In the electro-optical device in the third aspect of the present invention, for example, wirings, such as data lines and scanning lines are led from the image display region and arranged in the frame region. Besides the wirings or in addition to the wirings, transistors or circuit elements, such as TFTs or TFDs, which constitute at least some of peripheral circuits connected to the led wirings, are arranged in the frame region. Therefore, image signals are supplied to the display electrodes, such as pixel electrodes through the wirings and the circuit elements provided in the frame region, directly or through the pixel switching elements, such as TFTs, to permit active matrix driving or passive matrix driving.

Particularly, in the present invention, the three types of the shielding films, i.e., the lower shielding film, the in-region shielding film, and the out-of-region shielding film, are formed by using the same film. Of these shielding films, the lower shielding film avoids the light reflected by the pattern portion or passing through the spaces of the pattern portion from being mixed with the image, as described above with respect to the electro-optical device in the first aspect of the present invention. This can decrease the light-dark pattern projected near the edge of the display image.

On the other hand, the in-region shielding film increases the light resistance of the second transistors as the pixel switching elements formed in the image display region. Namely, the in-region shielding film is formed to cover the substrate sides of at least the channel regions of the second transistors, and thus prevents or substantially prevents incidence of light on the channel regions and reduces or suppresses the occurrence of a light leakage current from the channel regions. It is thus possible to prevent or substantially prevent or substantially prevent the occurrence of a change in the characteristics of the second transistors, or flickering of an image due to operation error or the like. Therefore, the quality of the display image can be enhanced.

Furthermore, in the present invention, the out-of-region shielding film is formed in the peripheral region around the image display region. The out-of-region shielding film is an idea including the lower shielding film, and is different from the lower shielding film in that the formation region of the out-of-region shielding film is not limited to the frame region. The out-of-region shielding film can cut off the travel of light passing through the periphery (i.e., the peripheral region) of the image display region. Therefore, in the present invention, it is possible to more effectively prevent or substantially prevent the phenomenon that a dim light image occurs around the display image, thereby permitting the display of a high-quality image with a good appearance.

Furthermore, in the present invention, all the lower shielding film, the in-region shielding film, and the out-of-region shielding film are formed by using the same film, i.e., simultaneously formed in the manufacturing process, thereby simplifying the manufacturing process or decreasing the manufacturing cost, as compared with a case in which these films are separately formed.

In the electro-optical device in the third aspect of the present invention, the out-of-region shielding film includes the second lower shielding film including the first lower shielding film and formed in the frame region except in the region in which the pattern portion is formed.

In this case, the second lower shielding film formed in the frame region except in the region in which the pattern portion is formed can prevent or substantially prevent the passage of light which cannot be sufficiently prevented or substantially prevented only by the first lower shielding film. Namely, in the region in which the pattern portion including the wirings and the circuit elements is no formed, unconditional passage of incident light can be prevented or substantially prevented. Therefore, in the present invention, it is possible to more effectively prevent or substantially prevent the phenomenon that a dim light image appears around the display image, thereby displaying a high quality image with a good appearance.

In the electro-optical device in the third aspect of the present invention, peripheral circuits to drive the display electrodes are provided in the peripheral region so as to be connected to the pattern portion, and the out-of-region shielding film is formed in a region other than the region in which a second pattern portion is formed for connecting at least a pair of wirings, a pair of circuit elements constituting the peripheral circuits, and a pair of wiring and circuit element.

In this case, the out-of-region shielding film is formed in the region except in the region in which the second pattern portion is formed for connecting at least a pair of wirings, a pair of circuit elements constituting the peripheral circuits, and a pair of wiring and circuit element. Namely, in this case, the out-of-region shielding film includes a portion formed to "fill" a portion of the peripheral region, where no element is basically formed Therefore, the out-of-region shielding film can further decease the occurrence of passage of the "passing" light.

In the portion where the wirings and the circuit elements constituting the peripheral circuits are formed, "direct" passage of light is prevented or substantially prevented by the wirings and the circuit elements (i.e., the passage of light is cut off by the wirings and the circuit elements to some extent). Therefore, the out-of-region shielding film can be formed in an appropriate and necessary portion. It is thus possible to realize a relative decease in the area of the shielding film, and a decrease in the action of internal stress of the out-of-region shielding film.

According to circumstance, the out-of-region shielding film may be formed in the region where the second pattern is formed. In this case, the out-of-region shielding film is formed over the entire region to cause the defect that the problem of internal stress becomes remarked. However, as described above with respect to the pattern portion, light is also absorbed or reflected by the second pattern portion, exhibiting a reasonable meaning. Namely, from the viewpoint of the prevention of substantial prevention of mixing of light absorbed or reflected by the second pattern portion with light for forming the image, it is meaningful to form the out-of-region shielding film in the region where the second pattern portion is formed. In this case, it is proper to briefly express that "the out-of-region shielding film is formed to cover the entire peripheral region."

In the electro-optical device in the second or third aspect of the present invention, the out-of-region shielding film is formed in islands.

In this case, the out-of-region shielding film is formed in islands, and thus the internal stress of the film can be apparently decreased, as compared with the shielding film formed over the entire region. Therefore, it is possible to prevent or substantially prevent a trouble in which the out-of-region shielding film is broken by its own internal stress, or a trouble in which the internal stress acts on other elements (for example, an interlayer insulating film) present around the out-of-region shielding film to cause cracks.

Particularly, in this case, the distance between the adjacent islands is 4 µm or less.

In this construction, the distance between the islands of the out-of-region shielding film is appropriately set. The reason for this is described in detail below. When the shielding film is formed in islands, light possibly passes through the spaces between the islands. For example, return light incident on the back of the substrate possibly passes through the spaces. In this case, the passing light is reflected by the frame shielding film or the like provided at the back and again passes through the spaces to be possibly mixed with light to form the image. However, in the present invention, the distance between the islands is 4 µm or less, and thus the above-described possibility less occurs.

Namely, because of the relatively narrow spaces of 4 µm or less, there is substantially no probability that light passing through the spaces is reflected by the element provided at the back and again passes through the spaces. Also, incident light, which is not return light, possibly passes through the spaces directly. However, in this case, the influence on the image can be minimized because of the relatively small distance.

Therefore, in the present invention, the function of the shielding films, i.e., the function to prevent or substantially prevent the occurrence of a light image around the display image, can be sufficiently exhibited while obtaining the function of the islanded the shielding film, i.e., the function to decrease the internal stress.

For the above-described reason, in the present invention, the distance between the adjacent islands is more preferably 2 µm or less.

The electro-optical device in the second or third aspect of the present invention may further include a mounting case for mounting the electro-optical device, the mounting case having a display window formed corresponding to the image display region, where at least one of the second lower shielding film and the out-of-region shielding film is formed in at least a portion of the region between the edge of the display window and the edge of the image display region.

In this case, the mounting case has the display window formed so that the image display region can be seen from the outside of the electro-optical device. Namely, in the display window portion including the image display region, light is substantially possibly transmitted, while in the other portions, light is cut off by the material (for example, preferably a metal material, such as magnesium or an alloy thereof) constituting the mounting case. This means that the presence of light reflected by the pattern portion, light passing through the pattern portion, or light passing through the region other than the region in which the pattern portion is formed, need not be taken into account as far as the portion other than the display window is concerned. However, in the display window except in the image display region, the above light must be taken into consideration.

In the present invention, at least one of the second shielding film and the out-of-region shielding film (hereinafter "shielding film of the present invention") is formed in at least a portion of the region between the edge of the display window and the edge of the image display region, and thus the above-described functions can be exhibited, and effective shielding can be achieved. At the same time, this means that the shielding film of the present invention may be formed in an appropriate necessary area, thereby realizing relative narrowing of the area. Therefore, the internal stress of the shielding film can be further decreased, thereby further enhancing the reliability of the device.

In the electro-optical device in the second or third aspect of the present invention, the lower shielding film, the second lower shielding film, the in-region shielding film or the out-of-region shielding film can be provided with the same characteristics as the lower shielding film of the electro-optical device in the first aspect of the present invention. Namely, such a shielding film may be formed on a flat substrate or underlying insulating film, may include a light-absorbing film, particularly at lest one of a polysilicon film and a high-melting-point metal film, may include a conductive film, or may have a fixed potential or floating potential. In this case, clearly, the same functions as described above can be obtained in the electro-optical device in the second or third aspect of the present invention.

The electro-optical device in the second or third aspect of the present invention further includes a frame shielding film disposed above the pattern portion in the frame region, the frame shielding film including aluminum.

In this case, the frame region can be defined by the frame shielding film disposed above the pattern portion and including, for example, a built-in shielding film formed on the substrate, or a shielding film formed on the counter substrate opposing the substrate with an electro-optical material, such as a liquid crystal provided therebetween.

Particularly, in the present invention, the frame shielding film includes at least aluminum, and thus light is easily reflected to less accumulate heat in the electro-optical device. Therefore, for example, the stable operation of a thin film transistor serving as a pixel switching element can be secured, thereby permitting the stable operation of the electro-optical device over a relatively long period of time.

However, with the frame shielding film including, such a material having high light reflectivity, the occurrence of the light-dark pattern projected around the display image or the occurrence of a dim light image appearing near the edge of the image becomes further remarkable.

However, in the present invention, the light-dark pattern projected outside the display image due to the internally reflected light, which is reflected by the inner surface of the frame shielding film, according to the pattern portion can be decreased by the lower shielding film disposed below the pattern portion. Furthermore, in the present invention, even when the internally reflected light reflected by the inner surface of the frame shielding film passes directly through the substrate, the second lower shielding film or the out-of-region shielding film can reduce or suppress the occurrence of a dim light image appearing near the edge of the display image.

In order to address or achieve the above, an electronic apparatus includes each of the above-described electro-optical devices of the present invention (including the various forms).

The electronic apparatus of the present invention includes the electro-optical device of the present invention, and thus the light-dark pattern due to the pattern portion including the wirings and the circuit elements provided in the frame region is not projected within the display image. It is thus possible to realize various electronic apparatuses capable of displaying high-quality images, such as a projection display device, a liquid crystal television, a cellular phone, an electronic notebook, a word processor, a view finder-type or monitor direct viewing video tape recorder, a work station, a picture phone, a POS terminal, a touch panel, etc., for example.

The operation and advantages of the present invention will be made apparent from the description of embodiments below.

DETAILED DESCRIPTION OF PREFERRED EMBODIMENTS

Embodiments of the present invention will be described below with reference to the drawings. In each of the embodiments, an electro-optical device of the present invention is applied to a liquid crystal device.

(First Embodiment)

The whole construction of an electro-optical device according to a first embodiment of the present invention is first described with reference to FIGS. 1 and 2. Here, a liquid crystal device in a built-in driving circuit-type TFT active matrix driving system is described as an example of electro-optical devices.

Figure 1:
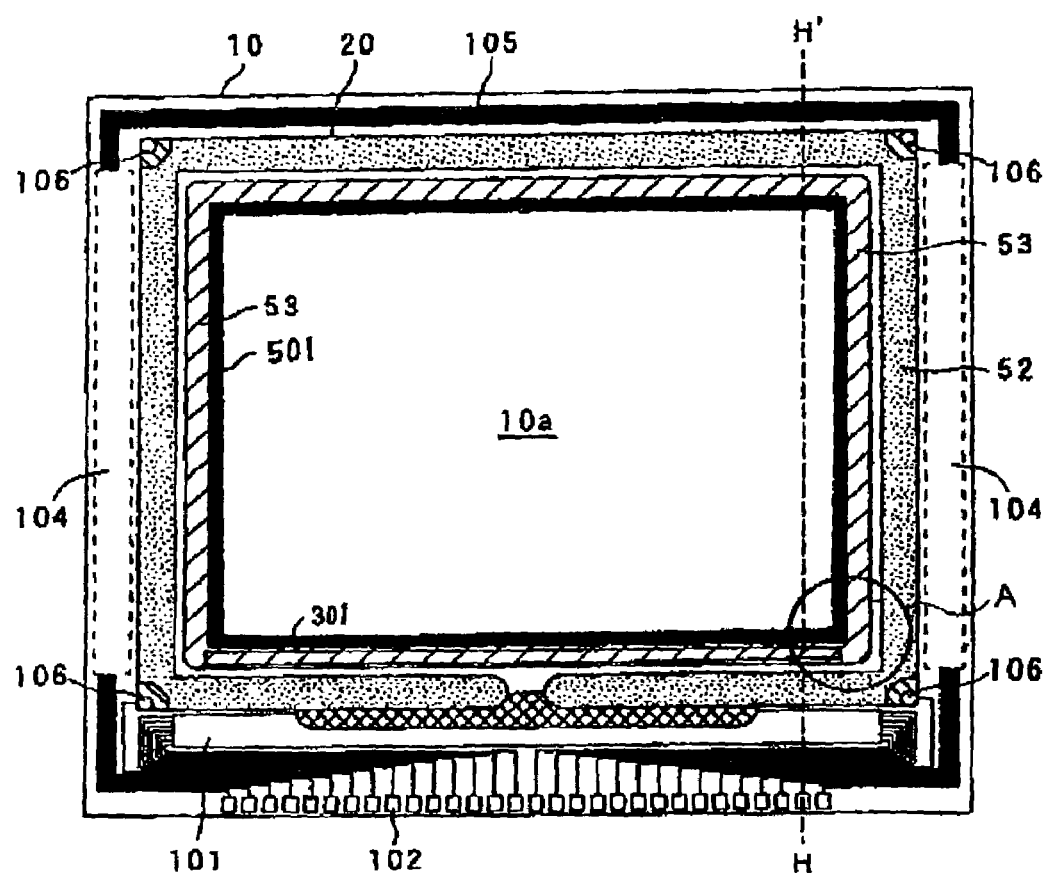
FIG. 1 is a plan view showing a TFT array substrate in an electro-optical device together with components formed on the substrate according to a first embodiment of the present invention, as viewed from the counter substrate side.
Figure 2:
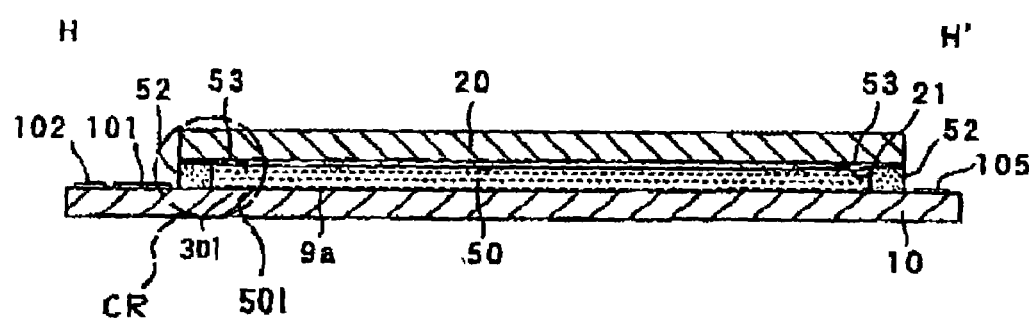
FIG. 2 is a sectional view taken along plane H—H' in FIG. 1.

FIG. 1 is a plan view showing a TFT array substrate together with the components formed thereon, as viewed from the counter substrate side, and FIG. 2 is a sectional view taken along plane H—H' in FIG. 1.

In FIGS. 1 and 2, the electro-optical device of this embodiment includes a TFT array substrate 10 and a counter substrate 20 which are disposed opposite to each other. A liquid crystal layer 50 is sealed between the TFT array substrate 10 and the counter substrate 20, and the TFT array substrate 10 and the counter substrate 20 are bonded together with a sealing material 52 provided in a seal region positioned around an image display region 10a.

In order to bond the TFT array substrate 10 and the counter substrate 20 together, the sealing material 52 includes, for example, an ultraviolet curing resin, a thermal curing resin, or the like. The sealing material 52 is coated on the TFT array substrate 10, and then curved by ultraviolet irradiation, heating, or the like in the manufacturing process. Furthermore, the sealing material 52 includes glass fibers or glass beads dispersed therein, to set the distance (substrate gap) between the TFT array substrate 10 and the counter substrate 20 to a predetermined value. Namely, the electro-optical device of this embodiment is suitable as a light valve for a small projector for extended display. However, when the electro-optical device is used as a large liquid crystal device for 1x magnification display, such as a liquid crystal display or a liquid crystal television, such a gap material may be contained in the liquid crystal layer 50.

Furthermore, a light-shielding frame shielding film 53 is provided in parallel with the inner side of the seal region in which the sealing material 52 is disposed, so as to define the image display region 10a. The frame shielding film may be partially or entirely provided as a built-in shielding film on the TFT array substrate 10.

Particularly, in this embodiment, a lower shielding film 501 is partially formed below the frame shielding film 53. The lower shielding film 501 is partially formed below the frame shielding film 53 to extend from the outer edge of the image display region 10a to the outer periphery. The structure and the shielding function of the lower shielding film 501 are described below.

In the peripheral region of the image display region 10a, a data line driving circuit 101 and external circuit connection terminals 102 are provided along one side of the TFT array substrate 10 in a portion outside the seal region in which the sealing material 52 is disposed. Furthermore, in the portion outside the seal region, scanning line driving circuits 104 are provided along the two sides adjacent to the one side of the TFT array substrate 10. Also, a plurality of wirings 105 is provided on the remaining side of the TFT array substrate 10, to connect the scanning line driving circuits 104 provided on the two sides of the image display region 10a. As shown in FIG. 1, vertical conductive materials 106 having the function as a vertical conduction terminal between the two substrates are provided at the four corners of the counter substrate 20. On the other hand, on the TFT array substrate 10, vertical conduction terminals are provided at positions corresponding to the four corners of the counter substrate 20. This can achieve electrical conduction between the TFT array substrate 10 and the counter substrate 20.

Particularly, in this embodiment, a sampling circuit 301 to sample image signals supplied from the data line driving circuit 101 is provided in the frame region including the frame shielding film 53. Namely, the circuit elements described below, such as TFTs constituting the sampling circuit 301, are disposed in the frame region. Furthermore, various wiring portions such as a wiring portion extending from the data lines provided in the image display region 10a to the sampling circuit 301, a wiring portion extending from the data line driving circuit 101 to the sampling circuit 301, and a wiring portion extending from the scanning lines provided in the image display region 10a to each of the scanning line driving circuits 104 are disposed in the frame region.

In FIG. 2, on the TFT array 10, pixel switching TFTs, and the wirings such as the scanning lines and the data lines are formed for pixel electrodes 9a, and an alignment film is further formed on the pixel electrodes 9a. On the other hand, on the counter substrate 20, a counter electrode 21 and an alignment film as an uppermost layer are formed. The liquid crystal layer 50 includes, for example, a nematic liquid crystal or a mixture of several types of nematic liquid crystals, and assumes a predetermined orientation state between two alignment films.

Besides the data line driving circuit 101, the scanning ling driving circuits 104, and the sampling circuit 301, a pre-charge circuit to supply a pre-charge signal in a predetermined voltage level to each of the plurality of data lines before image signals, an inspection circuit to inspect the quality and defects of the electro-optical device in the course of manufacture and at the time of shipment may be formed on the TFT array substrate 10 shown in FIGS. 1 and 2.

Figure 3:
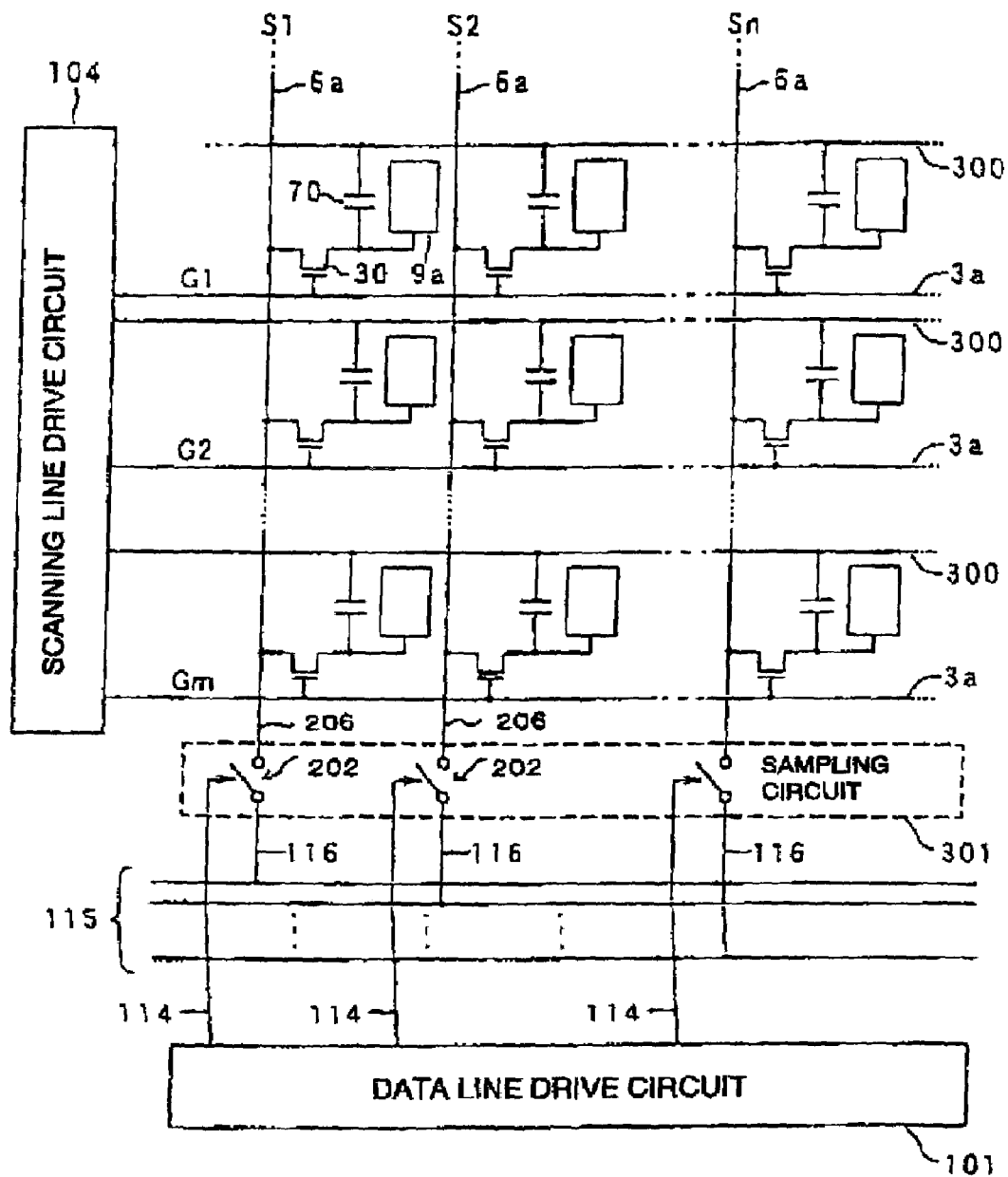
FIG. 3 is a schematic showing equivalent circuits including various elements provided on a plurality of pixels arranged in a matrix to form an image display region and wirings, and peripheral circuits in the electro-optical device of the first embodiment of the present invention.

Next, the circuit configurations and the operation of the electro-optical device having the above construction are described below with reference to FIG. 3. FIG. 3 is a schematic showing equivalent circuits including various elements of the plurality of pixels formed in a matrix in the image display region, and wirings, and the peripheral circuits in the electro-optical device.

In the electro-optical device of this embodiment shown in FIG. 3, the pixel electrode 9a and a TFT 30 to control switching of the corresponding pixel electrode 9a are formed for each of the plurality of pixels formed in a matrix to form the image display region, and a data line 6a, to which image signals are supplied, is electrically connected to the source of the corresponding TFT 30.

In the peripheral region outside the image display region 10a, an end (the lower end in FIG. 3) of each of the data lines 6a is connected to the drain of a corresponding TFT 202 constituting the sampling circuit 301. On the other hand, image signal lines 115 are respectively connected, through lead wirings 116, to the sources of the TFTs 202 constituting the sampling circuit 301. Furthermore, sampling circuit driving signal lines 114 connected to the data line driving circuit 101 are respectively connected to the gates of the TFTs 202 constituting the sampling circuit 301. Therefore, image signals S1, S2, . . . , Sn supplied through the image signal lines 115 are sampled by the sampling circuit 301 according to the sampling circuit driving signals supplied from the data line driving circuit 101 through the sampling circuit driving signal lines 114, and then supplied to the respective data lines 6a.

The image signals S1, S2, . . . , Sn written in the data lines 6a may be sequentially supplied in that order, or may be supplied to each group including a plurality of adjacent data lines 6a.

The scanning lines 3a are also electrically connected to the gates of the pixel switching TFTs 30 so that pulsed scanning signals G1, G2, . . . , Gn are line-sequentially supplied, in that order, to the scanning lines 3a from the scanning line driving circuits 104 with predetermined timing. The pixel electrodes 9a are respectively electrically connected to the drains of the TFTs 30, and the switches of each of the TFTs 30 serving as the switching elements are closed for a predetermined time to write the image signals S1, S2, . . . , Sn supplied from the data lines 6a with predetermined timing. The image signals S1, S2, . . . , Sn in the predetermined level written in the liquid crystal as an example of electro-optical materials through the pixel electrodes 9a are stored between the TFT array substrate 10 and the counter electrode 21 formed on the counter substrate 20 for a predetermined time. The orientation and order of the molecules of the liquid crystal vary with the potential level applied to modulate light, thereby permitting a gray-scale display. In a normally white mode, the transmittance of incident light decreases according to the voltage applied by pixel, while in a normally black mode, the transmittance of incident light increases according to the voltage applied by pixel. As a result, light having contrast corresponding to the image signals is emitted from the electro-optical device as a whole. In order to prevent or substantially prevent a leakage of the image signals stored, a storage capacitor 70 is added in parallel with a liquid capacitance formed between each of the pixel electrodes 9a and the counter electrode 21. Also, capacitance lines 300 fixed at a predetermined potential and containing fixed potential-side electrodes of the storage capacitor 70 are provided in parallel with the scanning lines 3a.

Figure 4:
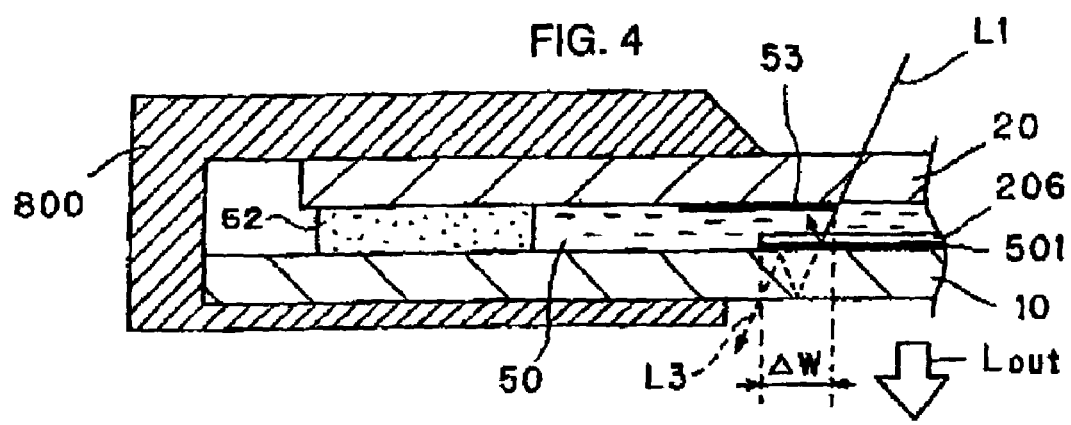
FIG. 4 is an enlarged partial sectional view showing a portion near the CR portion shown in FIG. 2.
Figure 5:
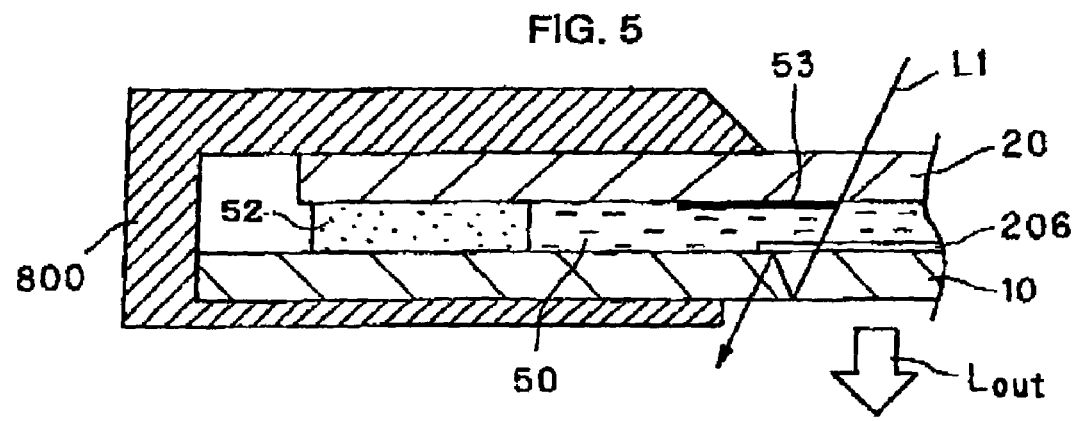
FIG. 5 is an enlarged partial sectional view showing a portion of a comparative example, which corresponds to the vicinity of the CR portion shown in FIG. 2.
Figure 6:
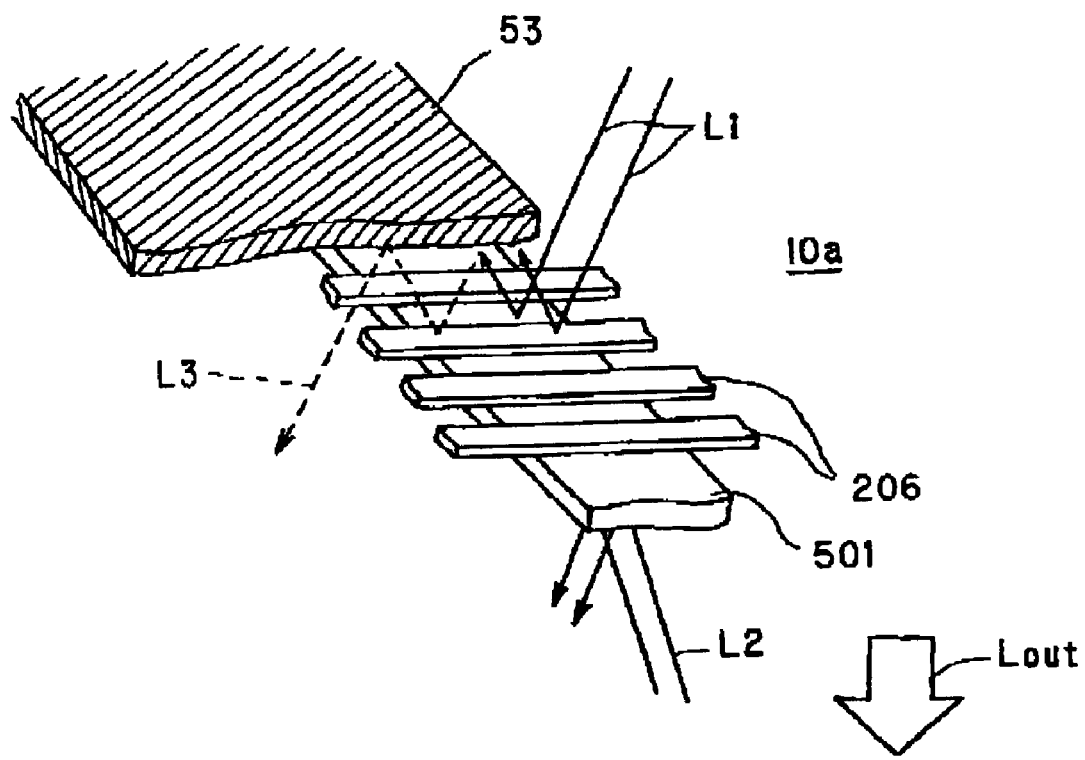
FIG. 6 is a schematic partial perspective view showing a frame shielding film, data line lead wiring, and a lower shielding film in the portion shown in FIG. 4.

With respect to the detailed configuration of the frame region including the frame shielding film 53 and the peripheral region of the electro-optical device shown in FIGS. 1 and 2, the structure and the function of the lower shielding film 501 provided in the frame region are mainly described with reference to FIGS. 4 to 7. FIG. 4 is an enlarged partial sectional view showing the vicinity of the CR portion shown in FIG. 2, and FIG. 5 is an enlarged partial sectional view showing a portion of a comparative example, which corresponds to the vicinity of the CR portion shown in FIG. 2. FIG. 6 is a schematic partial perspective view showing a portion including the frame shielding film 53, lead wirings 206 of the data lines 6a, and the lower shielding film 501 shown in FIG. 4, and FIG. 7 a schematic partial perspective view showing a portion including the frame shielding film 53 and the lead wirings 206 of the data lies in the comparative example.

As shown in FIG. 4, in this embodiment, various wirings such as the lead wirings 206 of the data lines 6a, and various circuit elements, such as the TFTs constituting the sampling circuit 301 are disposed as an example of a pattern portion in the frame region below the frame shielding film 53. The lower shielding film 501 is provided below the lead wirings 206 provided in the frame region.

In the comparative example shown in FIG. 5, the lower shielding film 501 is not provided.

As shown in FIG. 6, in this embodiment, therefore, when incident light L1 incident from above has high strength and contains a large quantity of oblique component, as in application to a projector, the incident light L1 is reflected by the surfaces of the lead wirings 206 formed by patterning a conductive film of an A1 film, or the incident light passes through the spaces between the lead wirings 206 according to the reflectance of the lead wirings 206. The TFT array substrate side (the lower side in FIG. 6) of the lead wirings 206 is covered with the lower shielding film 501. Therefore, of the incident light L1 reflected by the lead wirings 206 or passing through the spaces between the lead wirings 206 in the vicinity of the periphery of the frame region, i.e., the vicinity of the periphery of the image display region 10a, the quantity of light L3 finally mixed with emitted light $L_{out}$ for display directly or after internal reflection is significantly decreased by a quality corresponding to the quantity of liquid absorbed or reflected by the lower shielding film 501.

More specifically, as shown in FIGS. 4 and 6, when light reflected by the lead wirings 206 travels toward the TFT array substrate 10 near the frame shielding film 53 because the light is reflected by the inner surface of the frame shielding film 53, the quantity of light mixed with the emitted light $L_{out}$ for display is decreased by a quantity corresponding to the quantity of light absorbed or reflected by the lower shielding film 501. With respect to return light L2 produced when internally reflected light, which is reflected by the frame shielding film 53, and light, which is transmitted through the lead wirings 206, are reflected by the back side of the TFT array substrate 10 and a polarizing plate, a retardation plate, and dustproof glass, which are provided on the outside of the TFT arrays substrate, the quantity of light finally mixed with the emitted light $L_{out}$ for display is decreased by a quantity corresponding to the quantity of light absorbed or reflected by the lower shielding film 501. Furthermore, in a multi-substrate projector, with respect to internally reflected light produced by further reflection of the return light L2 by the lead wirings 206 and the frame shielding film 53, the quantity of light finally mixed with the emitted light $L_{out}$ for display is decreased by a quantity corresponding to the quantity of light absorbed or reflected by the lower shielding film 501.

The electro-optical device is contained in a light-shielding mounting case 800 including a resin or the like, and thus leakage light in the mounting case 800 is absorbed by the inner surface of the mounting case 800, causing no problem or substantially no problem.

Figure 7:
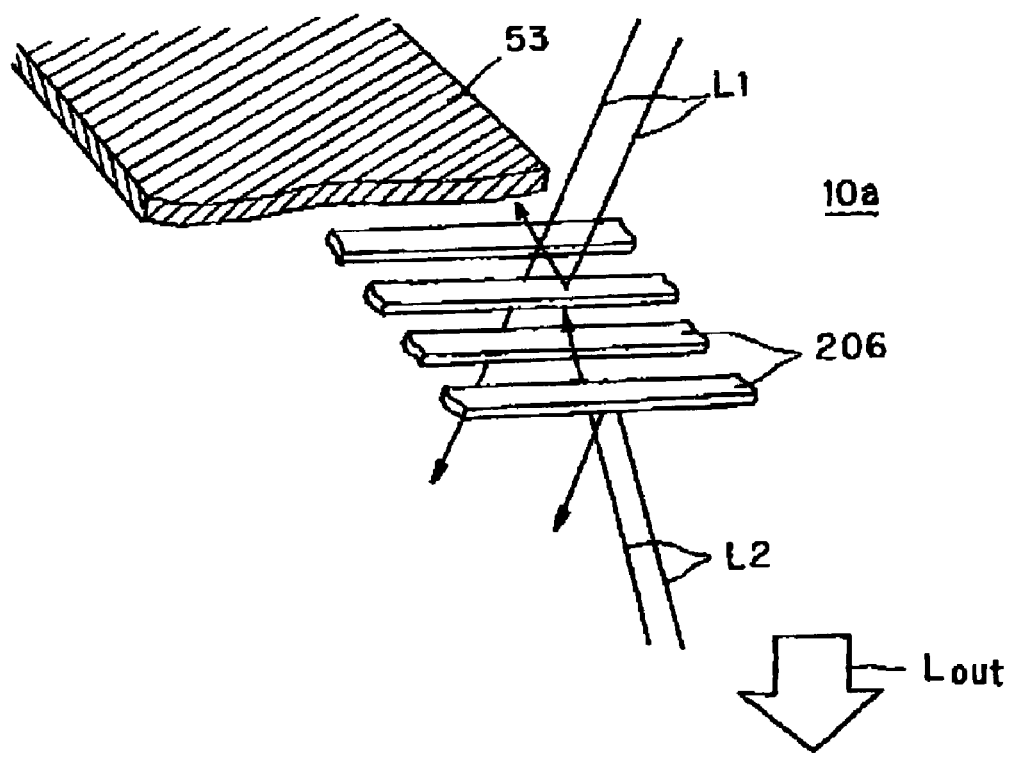
FIG. 7 a schematic partial perspective view showing a frame shielding film and data line lead wiring in the portion of the comparative example shown in FIG. 5.

On the other hand, as shown in the comparative example shown in FIGS. 5 and 7 in which the lower shielding film 501 is not provided, of the incident light L1 reflected by the lead wirings 206 or passing through the spaces between the lead wirings 206 in the vicinity of the periphery of the frame region, i.e., the vicinity of the periphery of the image display region 10a, the quantity of light L finally mixed with emitted light $L_{out}$ for display directly or after internal reflection is significantly increased, as compared with this embodiment including the lower shielding film 501. In addition, the comparative example, with respect to the return light L2 near the frame region, i.e., near the periphery of the image display region 10a, the quantity of light reflected by the lead wirings 206 or passing through the spaces between the lead wirings 206, further reflected by the inner surface of the frame shielding film, and finally mixed with emitted light $L_{out}$ for display directly or after internal reflection is significantly increased, as compared with this embodiment including the lower shielding film 501.

Therefore, in this embodiment including the lower shielding film 501 provided below the pattern portion including the lead wirings 206, it is possible to decrease the occurrence of light having a light-dark pattern due to the light and shade of the pattern portion and interference of light in the emitted light $L_{out}$ for display near the periphery of the image display region 10a. Therefore, it is effectively possible to prevent or substantially prevent the occurrence of the light-dark pattern de to the pattern portion near the outside of the display image.

In this embodiment, the lower shielding film 501 is preferably formed directly on the flat surface of the TFT array substrate 10, or on a flat underlying insulating film deposited on the flat TFT array substrate 10. In this case, substantially no irregularity or substantially no irregularity occurs in the surface of the lower shielding film 501. Therefore, even if the incident light L1 and return light L2 shown in FIGS. 5 and 7 are partially reflected by the lower shielding film 501, and finally mixed with the emitted light $L_{out}$ for display, light reflected by the flat lower shielding film 501 has substantially no interference, and thus the light-dark pattern due to interference can be significantly decreased.

The lower shielding film 501 includes a single metal, an alloy, a metal silicide, or a polysilicide, which contains at least one of high-melting-point metals, for example, Ti (titanium), Cr (chromium), W (tungsten), Ta (tantalum), Mo (molybdenum), and the like, or a laminated layer of these materials. The lower shielding film 501 is preferably formed by using the same film as a lower shielding film to cover the lower sides of the channel regions of the pixel switching TFTs 30 in the image display region. Therefore, the lower shielding film to shield the pixel switching TFTs 30 and the lower shielding film 501 to prevent or substantially prevent the occurrence of the light-dark pattern in the frame region can be simultaneously formed in the same manufacturing process. Thus, it is possible to simplify the laminated structure on the TFT array substrate 10 and the manufacturing process.

In the lower shielding film 501, light shielding may be mainly performed by reflection, light absorption, or both reflection and absorption. In the case in which light shielding is mainly performed by absorption, the incident light L1 and the return light L2 near the frame region can be attenuated at each time of incidence of the light-absorbing film constituting the lower shielding film 501. Particular, when the return light L2 is a problem, the lower shielding film 501 may be formed in a two-layer or multi-layer structure including a light-absorbing layer formed on the TFT array substrate 10 side (lower side), and a reflecting film formed on the opposite side (upper side). On the other hand, when the incident light L1 is a problem, the lower shielding film 501 may be formed in a two-layer or multi-layer structure including a light-absorbing layer formed on the counter substrate 20 side (upper side), and a reflecting film formed on the opposite side (lower side). the light-absorbing layer includes, for example, at least one of a polysilicon film and a high-melting-point metal film.

Furthermore, the lower shielding film 501 is preferably formed in separated islands having a proper size unit. When the lower shielding film 501 is formed in the separated islands, the occurrence of stress due to the lower shielding film 501 can be relieved, as compared with a case in which the lower shielding film is formed over the entire frame region.

In this embodiment, as shown in FIG. 4, the lower shielding film 501 is formed with an overlap width ΔW in the region extending from the outer edge of the image display region 10a to the peripheral side. The overlap width ΔW is can be previously set according to the incident angle of the incident light L1 applied to the frame region. In application to a projector for extended projection, the incidence angle is generally large, and thus the overlap width ΔW must be increased to prevent or substantially prevent the occurrence of the light-dark pattern. The predetermined width can be separately set by experiment, experience or simulation, or the like in consideration of the specifications of the actual device.

Figure 8:
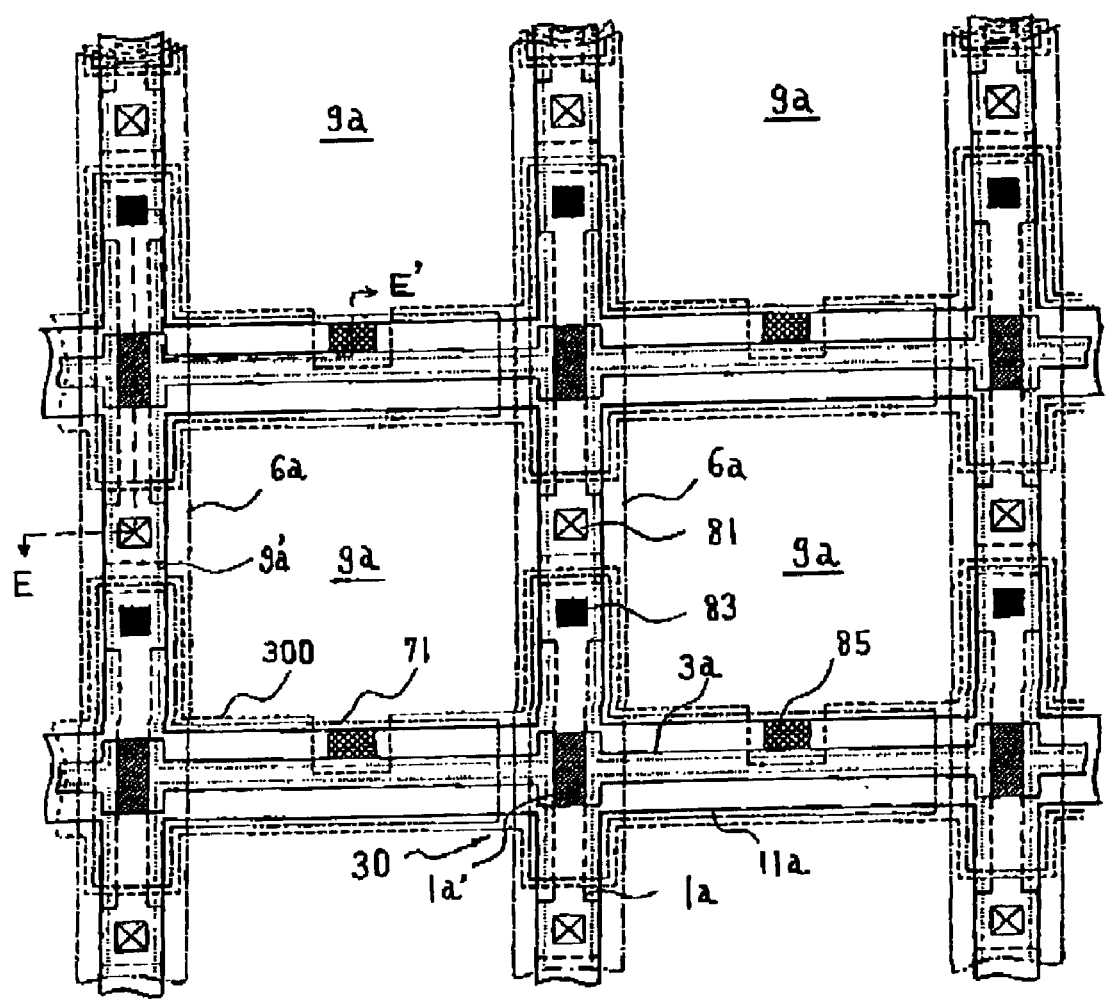
FIG. 8 is a plan view showing a plurality of adjacent pixel groups on a TFT array substrate on which data lines, scanning lines, pixel electrodes, etc., are formed in an electro-optical device according to an embodiment of the present invention.
Figure 9:
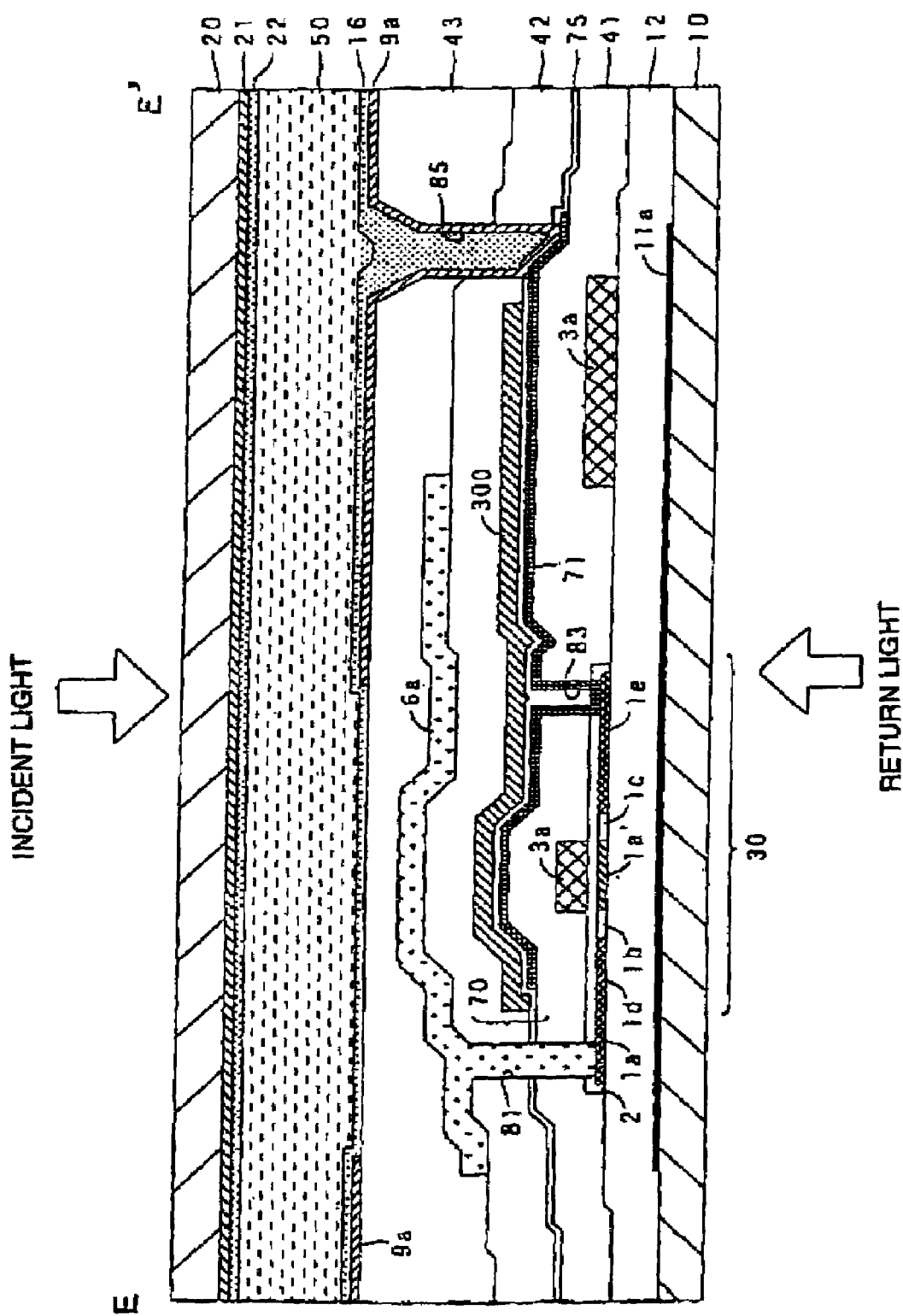
FIG. 9 is a sectional view taken along plane E—E' in FIG. 8.

A description is provided of the construction of an image display region of an electro-optical device according to an embodiment of the present invention with reference to FIGS. 8 and 9. FIG. 8 is a plan view showing a plurality of adjacent pixel groups on a TFT array substrate on which data lines, scanning lines, pixel electrodes, etc. are formed. FIG. 9 is a sectional view taken along plane E—E' in FIG. 8. In FIG. 9, layers and members are shown on different contraction scales in order to show the layers and members each having a recognizable size in FIG. 9.

In FIG. 8, on the TFT array substrate of the electro-optical device, a plurality of transparent pixel electrodes 9a (with the outer lines shown by dotted lines 9a') is provided in a matrix, and data lines 6a and scanning lines 3a are provided along the longitudinal and lateral boundaries between the pixel electrodes 9a.

Also, the scanning lines 3a are disposed so as to face channel regions 1a' of a semiconductor layer 1a, the channel regions 1a' being shown by oblique lines in FIG. 8, and the scanning lines 3a function as gate electrodes. Furthermore, a pixel switching TFT 30 in which the corresponding scanning line 3a is opposed as the gate electrode to the channel region 1a' is provided at each of the intersections of the scanning lines 3a and the data lines 6a.

As shown in FIGS. 8 and 9, a relay layer 71 as a pixel potential-side capacitance electrode, which is connected to the high-concentration drain region 1e of each TFT 30 and each of the pixel electrodes 9a, is disposed opposite to a portion of a capacitance line 300 as a fixed potential-side capacitance electrode through a dielectric film 75 to form a storage capacitance 70.

In a plan view, the capacitance lines 300 are formed in stripes extending along the scanning lines 3a, and the portions overlapping with the TFTs 30 project upward and downward in FIG. 8. Each of the capacitance lines 300 preferably includes a multilayer laminated structure including a first film including a conductive polysilicon film having a thickness of about 50 nm, and a second film including a metal silicide film containing a high-melting-point metal and having a thickness of about 150 nm. In this structure, the second film functions not only as the fixed potential-side capacitance electrode of each of the capacitance lines 300 or the storage capacitors 70, but also as a shielding layer to shield the upper side of the corresponding TFT 30 from incident light.

Particularly, in this embodiment, the capacitance lines 300 are formed between the scanning lines 3a and the data lines 6a, and thus capacitances are formed in the regions overlapping with the scanning lines 3a and the data lines 6a, thereby increasing the storage capacitors 70.

On the other hand, a lower shielding film 11a is formed in a lattice shape below the TFTs 30 on the TFT array substrate 10. The lower shielding film 11a includes a single metal, an alloy, a metal silicide, or a polysilicide including at least one of high-melting-point metals, for example, Ti, Cr, W, Ta, Mo, and the like, or a laminated film thereof.

Furthermore, the data lines 6a extending in the longitudinal direction of FIG. 8 and the capacitance lines 300 extending in the lateral direction of GIG. 8 are formed to cross each other, and the lower shielding film 11a is formed in a lattice shape, to define the aperture regions of the respective pixels.

As shown in FIGS. 8 and 9, the data lines 6a are electrically connected, through contact holes 81, to the high-concentration source regions 1a of the semiconductor layers 1a each including, for example, a polysilicon film. A relay layer including the same film as the relay layer 71 may be formed for electrically connecting the data lines 6a and the high-concentration source regions 1d through the relay layer and two contact holes.

The capacitance lines 300 are preferably extended from the image display region 10a (refer to FIG. 1), in which the pixel electrodes 9a are disposed to the periphery thereof, and electrically connected, to a constant potential source to have a fixed potential. As the constant potential source, a constant potential source for positive power and negative power supplied to the data line driving circuit 101 and the scanning line driving circuits 104 may be used, or a constant potential supplied to the counter electrode 21 of the counter substrate 20 may be used. Furthermore, like the capacitance lines 300, the lower shielding film 11a provided below the TFTs 30 may be extended from the image display region 10a to the periphery thereof, and connected to a constant potential source to avoid an adverse effect of a variation in the potential on the TFTs 30.

The pixel electrodes 9a are electrically connected to the high-concentration drain regions 1e of the semiconductor layers 1a through the relay layers 71 and the contact holes 83 and 85.

In FIGS. 8 and 9, the electric-optical device includes the transparent TFT array substrate 10, and the transparent counter substrate 20 opposed to the TFT array substrate 10. The TFT array substrate 10 includes, for example, a quartz substrate, a glass substrate, or a silicon substrate, and the counter substrate 20 includes, for example, a glass substrate or a quartz substrate.

As shown in FIG. 9, the pixel electrodes 9a are provided on the TFT array substrate 10, and an alignment film 16 subjected to a predetermined orientation treatment such as rubbing or the like is provided on the pixel electrodes 9a. Each of the pixel electrodes 9a includes, for example, a transparent conductive film, such as an ITO film or the like. The alignment film 16 includes, for example, a transparent organic film, such as a polyimide film or the like.

On the other hand, on the counter substrate 20, the counter electrode 21 is formed over the entire surface, and an alignment film 22 subjected to a predetermined orientation treatment, such as rubbing or the like is provided below the counter electrode 21. The counter electrode 21 includes, for example, a transparent conductive film, such as an ITO film or the like. The alignment film 22 includes a transparent organic film, such as a polyimide film or the like.

Furthermore, on the counter substrate 20, a shielding film may be provided in a lattice shape or stripes corresponding to the non-aperture regions of the respective pixels. In this structure, the capacitance lines 300 and the data lines 6a, which define the aperture regions as described above, and the shielding film on the counter substrate 20 can securely prevent or substantially prevent incident light from the counter substrate 20 side from being incident on the channel regions 1a', the low-concentration source regions 1b and the low-concentration drain regions 1c. Furthermore, when the shielding film on the counter substrate 20 includes a high-reflection film formed on at least the incidence side, the shielding film functions to prevent or substantially prevent a temperature rise of the electro-optical device. The shielding film on the counter substrate 20 is preferably formed with a small width within the non-aperture region so as not to narrow the aperture regions of the respective pixels when both substrates are bonded together. Even with the narrow shielding film, redundant light can be shielded, and the effect of preventing or substantially preventing a temperature rise in the electro-optical device due to incident light can be exhibited.

In the above-described construction, a liquid crystal as an example of electro-optical materials is sealed in the space surrounded by the sealing material (refer to FIGS. 1 and 2) between the TFT array substrate 10 and the counter substrate 20, which are disposed so that the pixel electrodes 9a face the counter electrode 21, to form a liquid crystal layer 50.

Furthermore, an underlying insulating film 12 is provided below the pixel switching TFTs 30. The underlying insulating film 12 has not only the function to insulate the TFTs 30 from the lower shielding film 11a, but also the function to prevent a change in the characteristics of the pixel switching TFTs 30 due to roughening at the time of polishing of the surface of the TFT array substrate 10, or strains remaining after cleaning, because the underlying insulating film 12 is formed over the entire surface of the TFT array substrate 10.

In FIG. 9, each of the pixel switching TFTs 30 has a LDD (Lightly Doped Drain) structure including the corresponding scanning line 3a, the channel region 1a' of the semiconductor layer 1a in which the channel is formed by an electric field the scanning line 3a, the insulating film 2 including a gate insulating film to insulate the scanning line 3a from the semiconductor layer 1a, the low-concentration source region 1b and the low-concentration drain region 1c of the semiconductor layer 1a, and the high-concentration source region 1d and the high-concentration drain region 1e of the semiconductor layer 1a.

Furthermore, a first interlayer insulating film 41 is formed on the scanning lines 3a, the contact holes 81 reaching the high-concentration source regions 1d, and the contact holes 83 reaching the high-concentration drain regions 1e being formed in the first interlayer insulating film 41.

The relay layers 71 and the capaictance lines 300 are formed on the first interlayer insulating film 41, and a second interlayer insulating film 42 is formed thereon, the contact holes 81 reaching the high-concentration source regions 1d, and the contact holes 85 reaching the relay layers 71 being formed in the second interlayer insulating film 42.

The data lines 6a are formed on the second interlayer insulating film 42, and a planarized third interlayer insulating film 43 is formed on the data lines 6a, the contact holes 85 reaching the relay layers 71 being formed in the third interlayer insulating film 43 The pixel electrodes 9a are provided on the upper surface of the third interlayer insulating film 43.

In this embodiment, the surface of the third interlayer insulating film 43 is planarized by CMP (Chemical Mechanical Polishing) processing or the like to decrease orientation defects in the liquid crystal in the liquid crystal layer 50 due to the steps caused by the wirings and the elements provided below the third interlayer insulating film 43.

As described above, in the first embodiment, the lower shielding film 501 is provided to decrease the light-dark pattern projected near the outside of the display image due to the pattern portion including the wirings, such as the lead wirings of the data lines, and the circuit elements such as the TFTs 202, which are provided in the frame region. Therefore, the frame shielding film 53 need not be wide to conceal the light-dark pattern, thereby permitting the formation of the large image display region 10a.

In addition, in the first embodiment, the lower shielding film 501 is provided in a portion corresponding to the pattern portion including the wirings, such as the lead wirings of the data lines, and the circuit elements such as the TFTs 202, which are provided in the frame region, not formed over the entire frame region. Therefore, the occurrence of stress can be decreased, as compared with a case in which the lower shielding film is formed over the entire frame region.

In the above-described embodiment, as shown in FIG. 9, the surface of the third interlayer insulating film 43 is planarized to decrease the steps which are produced in the regions of the surface (the surface of the third interlayer insulating film 43) below the pixel electrodes 9a along the data lines 6a and the scanning lines 3a by lamination of many conductive layers. However, instead of or in addition to this, grooves may be formed in the TFT array substrate 10, the underlying insulating film 12, the first interlayer insulating film 41, the second interlayer insulating film 42 or the third interlayer insulating film 43 so that the wirings, such as the data lines 6a and the like, and the TFTs 30 are buried in the grooves to planarize the surface. Alternatively, the upper surface of the second interlayer insulating film 42 may be planarized by CMP processing or using an organic or inorganic SOG to planarize the surface.

Next, second to fourth embodiments relating to examples of the planar shape of the lower shielding film 501 having the above structure, and modified embodiments thereof are described below. In each of these embodiments, the lower shielding film 501 includes a light shielding conductive film. Therefore, each of the embodiments relates to an example of the shape of the lower shielding film 501 suitable to decrease the adverse effect of variations in the electrical state or potential of the lower shielding film 501 disposed in the frame region on the operation of the circuit elements, such as the TFTs 202 disposed in the same frame region.

(Second Embodiment)

Figure 10:
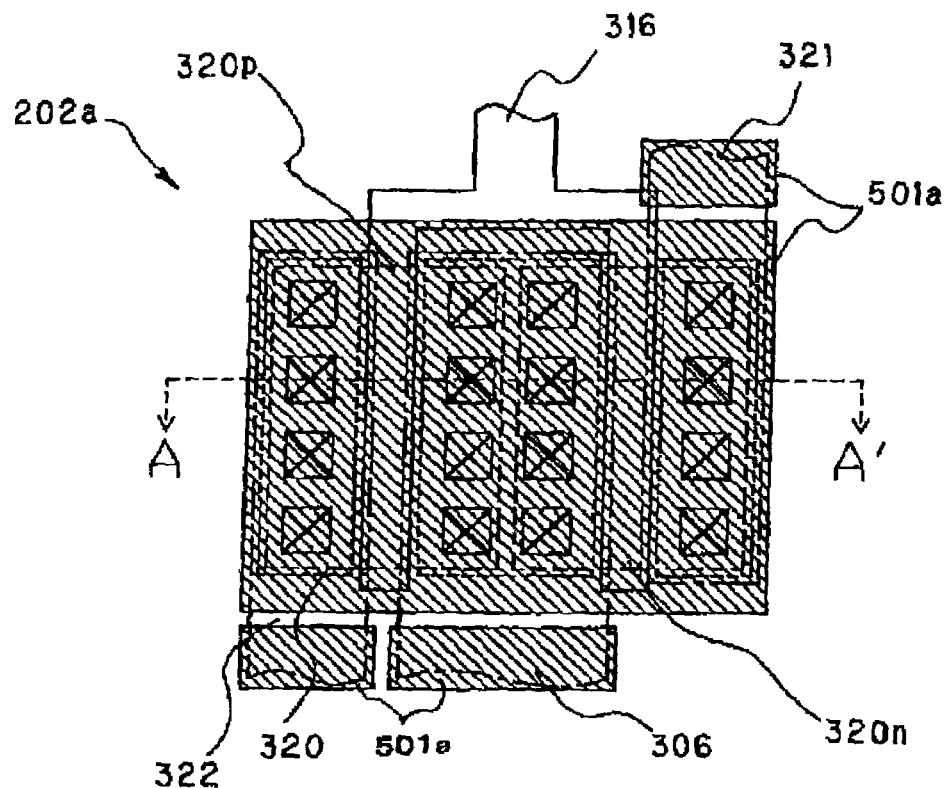
FIG. 10 is an enlarged plan view showing a complementary transistor constituting a peripheral circuit according to a second embodiment of the present invention.
Figure 11:
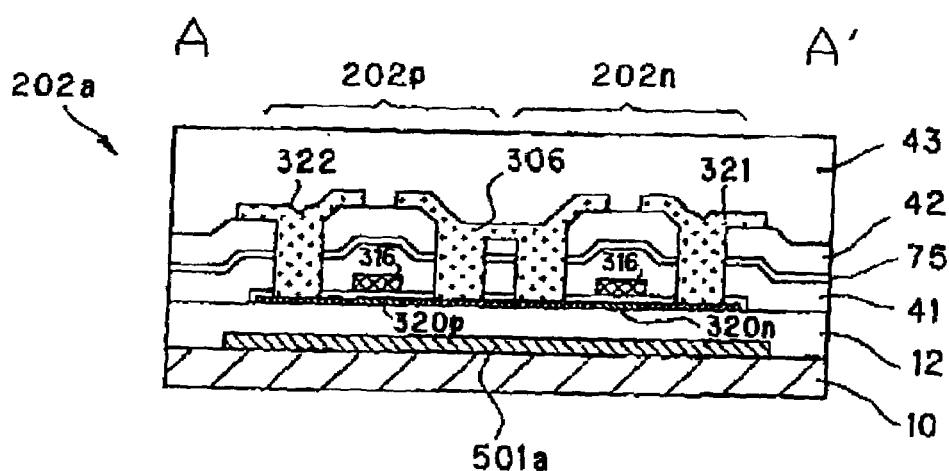
FIG. 11 is a sectional view taken along plane A—A' in FIG. 10.

An electro-optical device according to a second embodiment of the present invention is described with reference to FIGS. 10 and 11. FIG. 10 is an enlarged plan view of a complementary TFT as an example of a circuit element formed in the frame region in the second embodiment, and FIG. 11 is a sectional view taken along plane A—A' in FIG. 10. In FIGS. 10 and 11, the same components as the first embodiment shown in FIGS. 1 to 9 are denoted by the same reference numerals, and a description thereof is omitted.

As shown in FIGS. 10 and 11, a complementary TFT 202a includes a semiconductor layer 320 including a P-channel region 320p and a N-channel region 320n. Also, the complementary TFT 202a includes a combination of a P-channel TFT 202p and a N-channel TFT 202n including an end of wiring 316 as a gate electrode (input side), ends of low-potential wiring 321 and high-potential wiring 322 as source electrodes, and an end of wirings 306 as a drain electrode (output side). Like the pixel switching TFTs 30, each of the P-channel TFT 202p and the N-channel TFT 202n may have a LDD structure. Particularly, in the second embodiment, a lower shielding film 501a including a conductive film, such as a high-melting-point metal film is formed in separated islands, and each island portion covering at least the lower side of the complementary TFT 202a has a floating potential. The other components are the same as the first embodiment described above with reference to FIGS. 1 to 9.

Therefore, in the second embodiment, the lower shielding film 501a has a floating potential, and thus the adverse effect of a variation in the potential of the lower shielding film 501 on the characteristics of the complementary TFT 202a can be effectively prevented or substantially prevented.

In the second embodiment, like the lower shielding film 11a provided in the image display region 10a, the lower shielding film 501a except the islands portions facing the complementary TFTs 202a may be formed in such a manner that a fixed potential is supplied thereto.

(Third Embodiment)

Figure 12:
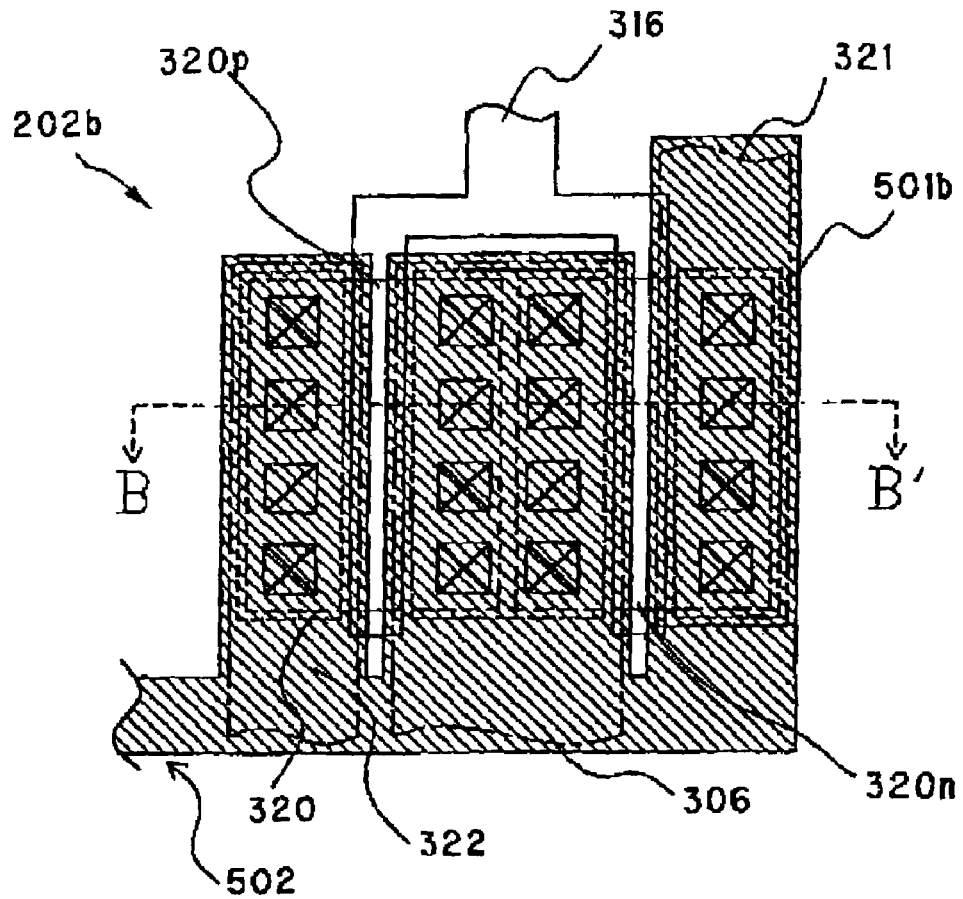
FIG. 12 is an enlarged plan view showing a complementary transistor constituting a peripheral circuit according to a third embodiment of the present invention.
Figure 13:
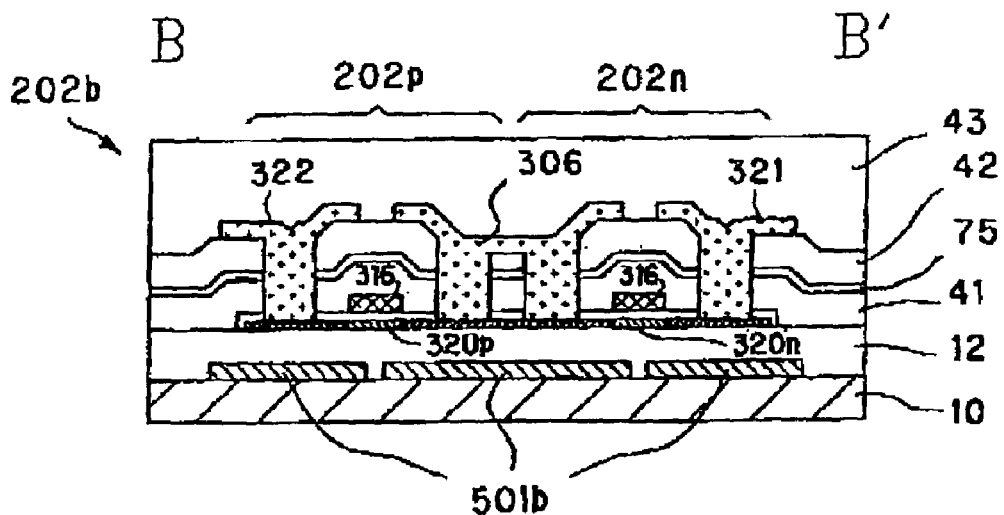
FIG. 13 is a sectional view taken along plane B—B' in FIG. 12.

An electro-optical device according to a third embodiment of the present invention is described with reference to FIGS. 12 and 13. FIG. 12 is an enlarged plan view of a complementary TFT as an example of a circuit element formed in the frame region in the third embodiment, and FIG. 13 is a sectional view taken along plane B—B' in FIG. 12. In FIGS. 12 and 13, the same components as the first embodiment shown in FIGS. 1 to 9 and the second embodiment shown in FIGS. 10 and 11 are denoted by the same reference numerals, and a description thereof is omitted.

As shown in FIGS. 12 and 13, in the third embodiment, unlike in the second embodiment, particularly a lower shielding film 501b including a conductive film, such as a high-melting-point metal film is not formed n separated islands, but two slits are formed along two gate electrodes of each complementary TFT 202b. The other components are the same as the second embodiment described above with reference to FIGS. 10 and 11.

Therefore, in the third embodiment, it is possible to decrease capacitance coupling between the source and drain electrodes of each complementary TFT 202b due to the parasitic capacitance between the lower shielding film 501b and the source electrode, and the parasitic capacitance between the lower shielding film 501b and the drain electrode, thereby effectively preventing or substantially preventing the adverse effect of a variation in the potential of the lower shielding film 501b on the characteristics of the complementary TFTs 202b.

The lower shielding film 501b may have the slits each having a width of, for example, about 1 μm. Even when such slits are formed, the slits cause only a relatively small light-dark pattern because the gate electrodes including a conductive polysilicon film exhibit some light absorbability.

In the third embodiment, like the lower shielding film 11a provided in the image display region 10a, the lower shielding film 502b may be formed in such a manner that a fixed potential is supplied thereto through an extended portion 502.

(Fourth Embodiment)

Figure 14:
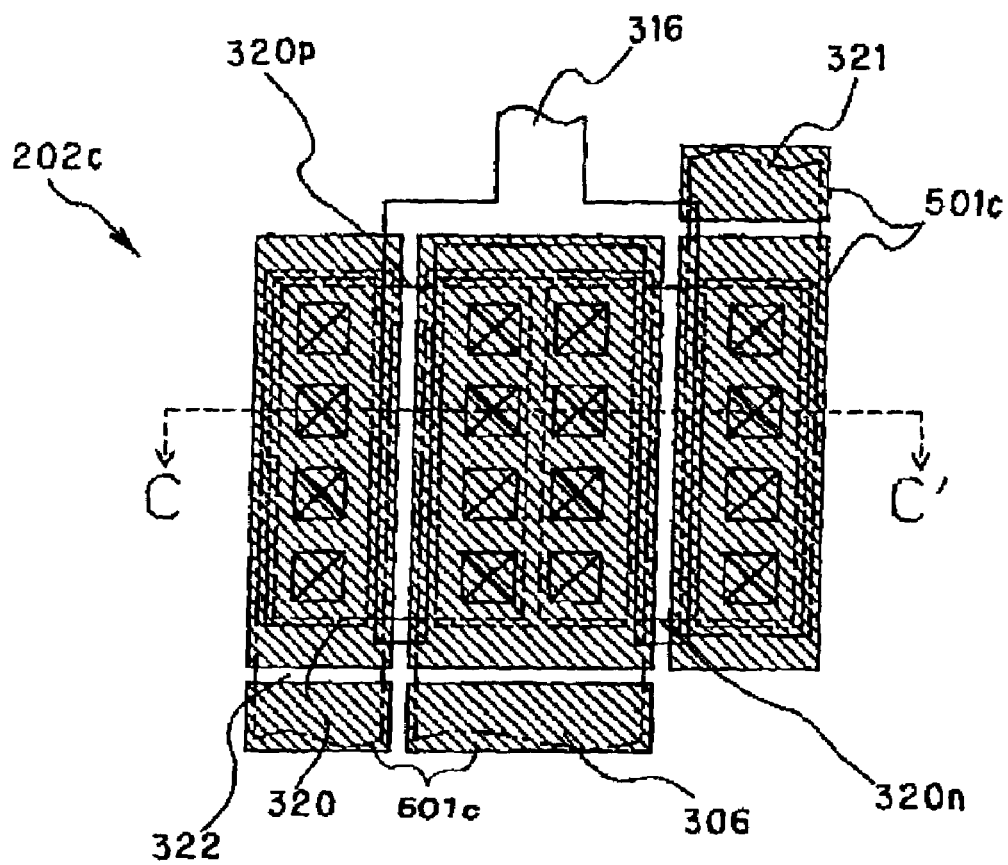
FIG. 14 is an enlarged plan view showing a complementary transistor constituting a peripheral circuit according to a fourth embodiment of the present invention.
Figure 15:
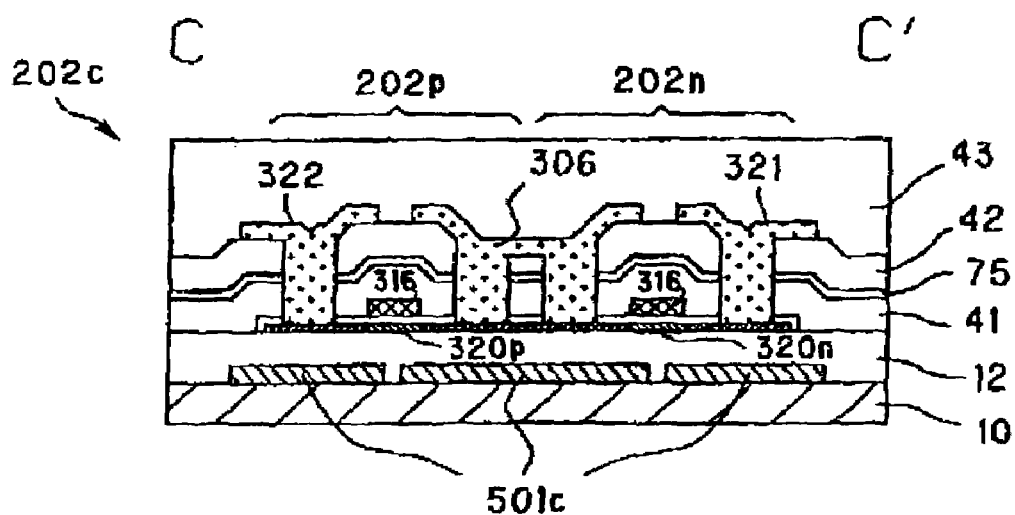
FIG. 15 is a sectional view taken along plane C—C' in FIG. 14.

An electro-optical device according to a fourth embodiment of the present invention is described with reference to FIGS. 14 and 15. FIG. 14 is an enlarged plan view of a complementary TFT as an example of a circuit element formed in the frame region in the fourth embodiment, and FIG. 15 is a sectional view taken along plane C—C' in FIG. 14. In FIGS. 14 and 15, the same components as the first embodiment shown in FIGS. 1 to 9 and the second embodiment shown in FIGS. 10 and 11 are denoted by the same reference numerals, and a description thereof is omitted.

As shown in FIGS. 14 and 15, in the fourth embodiment, unlike in the first embodiment, particularly a lower shielding film 501c including a conductive film, such as a high-melting-point metal film is not formed in separated large islands based on the semiconductor layers 320 of complementary TFTs, but formed in separated small islands based on the source and drain regions of the semiconductor layer 320 of each complementary TFT 202c. The other components are the same as the second embodiment described above with reference to FIGS. 10 and 11.

Therefore, in the fourth embodiment, it is possible to decrease capacitance coupling between the source and drain electrodes of each complementary TFT 202c due to the parasitic capacitance between the lower shielding film 501c and the source electrode, and the parasitic capacitance between the lower shielding film 501c and the drain electrode, thereby effectively preventing or substantially preventing the adverse effect of a variation in the potential of the lower shielding film 501c on the characteristics of the complementary TFTs 202c.

The spaces between the small islands of the lower shielding film 501c may be, for example, about 1 μm. Even when such spaces are formed, the spaces cause only a relatively small light-dark pattern because the gate electrode including a conductive polysilicon film exhibits some extent of light absorbability.

In the fourth embodiment, like the lower shielding film 11a provided in the image display region 10a, the lower shielding film 502c except the island portions facing the complementary TFTs 202c may be formed in such a manner than a fixed potential is supplied thereto.

(Fifth Embodiments)

Figure 16:
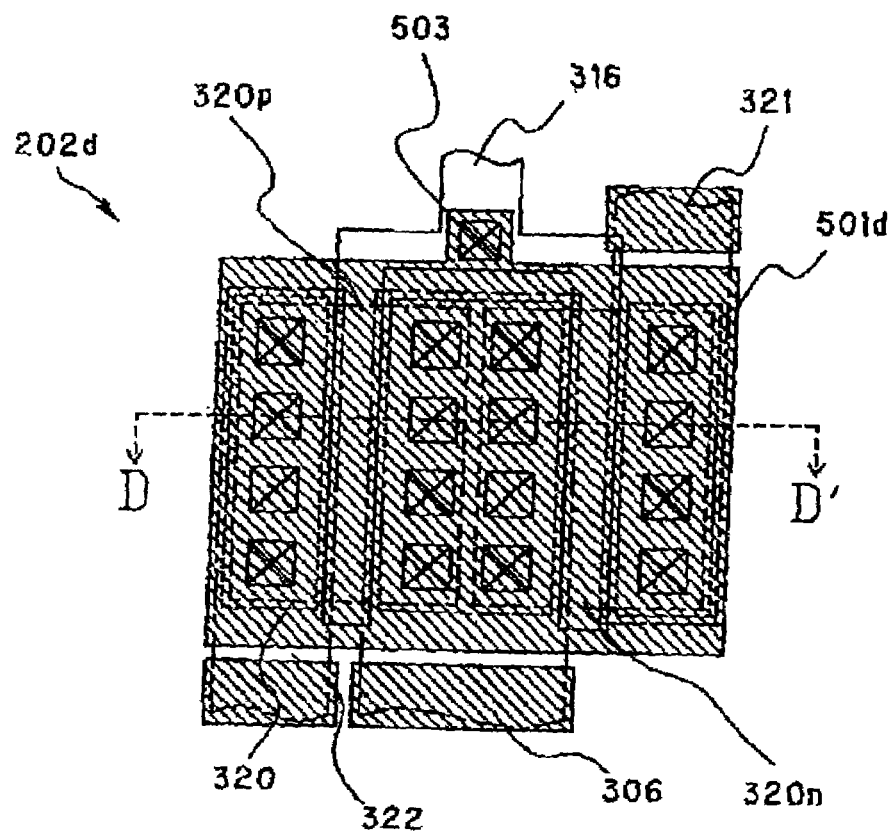
FIG. 16 is an enlarged plan view showing a complementary transistor constituting a peripheral circuit according to a fifth embodiment of the present invention.
Figure 17:
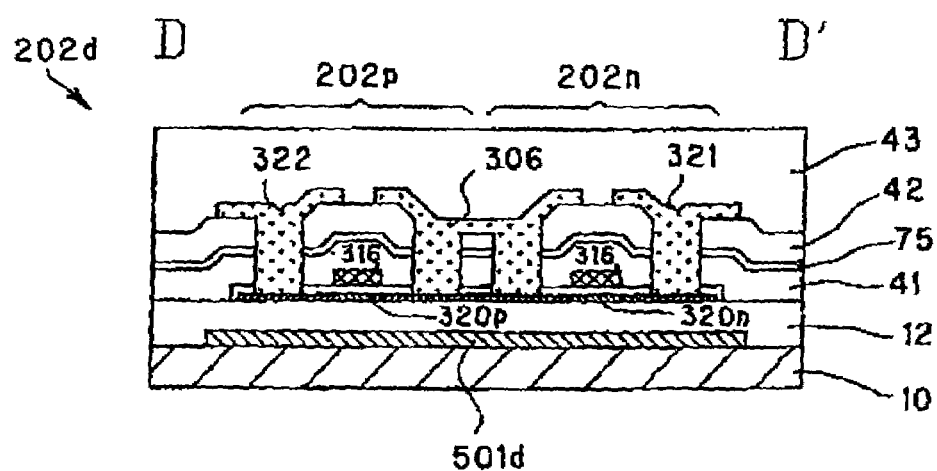
FIG. 17 is a sectional view taken along plane D—D' in FIG. 16.

An electro-optical device according to a fifth embodiment of the present invention is described with reference to FIGS. 16 and 17. FIG. 16 is an enlarged plan view of a complementary TFT as an example of a circuit element formed in the frame region in the fifth embodiment, and FIG. 17 is a sectional view taken along plane D—D' in FIG. 16. In FIGS. 16 and 17, the same components as the first embodiment shown in FIGS. 1 to 9 and the second embodiment shown in FIGS. 10 and 11 are denoted by the same reference numerals, and a description thereof is omitted.

As shown in FIGS. 16 and 17, in the fifth embodiment, particularly a lower shielding film 501d including a conductive film, such as a high-melting-point metal film is formed in separated large islands based on the semiconductor layers 320 of complementary TFTs, but unlike in the second embodiment, the island portions do not have a floating potential. Each of the island portions is connected to the gate electrode (the input side) at an end of wiring 316 through a contact hole 503 to have the same potential as the gate electrode. The other components are the same as the second embodiment described above with reference to FIGS. 10 and 11.

Therefore, in the fifth embodiment, back channels can be formed by the island portions of the lower shielding film 501d, thereby enhancing the transistor characteristics of the complementary TFTs 202d.

In the fifth embodiment, like the lower shielding film 11a provided in the image display region 10a, the lower shielding film 502d except the island portions facing the complementary TFTs 202d may be formed in such a manner that a fixed potential is supplied thereto.

In each of the above-described embodiments described above with reference to FIGS. 1 to 17, the data line driving circuit 101 and the scanning line driving circuit 104 may be electrically and mechanically connected to a driving LSI, which is mounted on, for example, a TAB (Tape Automated Bonding) substrate, through an anisotropic conductive film provided in the periphery of the TFT array substrate 10 instead of being provided on the TFT array substrate 10. Furthermore, a polarizing film, a retardation film, a polarizing plate, and the like are provided in any desired direction on each of the incidence side of the counter substrate 20 and the emission side of the TFT array substrate 10 according to the operation mode, for example, a TN (Twisted Nematic) mode, a VA (Vertically Aligned) mode, a PDLC (Polymer Dispersed Liquid Crystal) mode, or the like, and a normally white mode/normally black mode.

(Sixth Embodiment)

Figure 18:
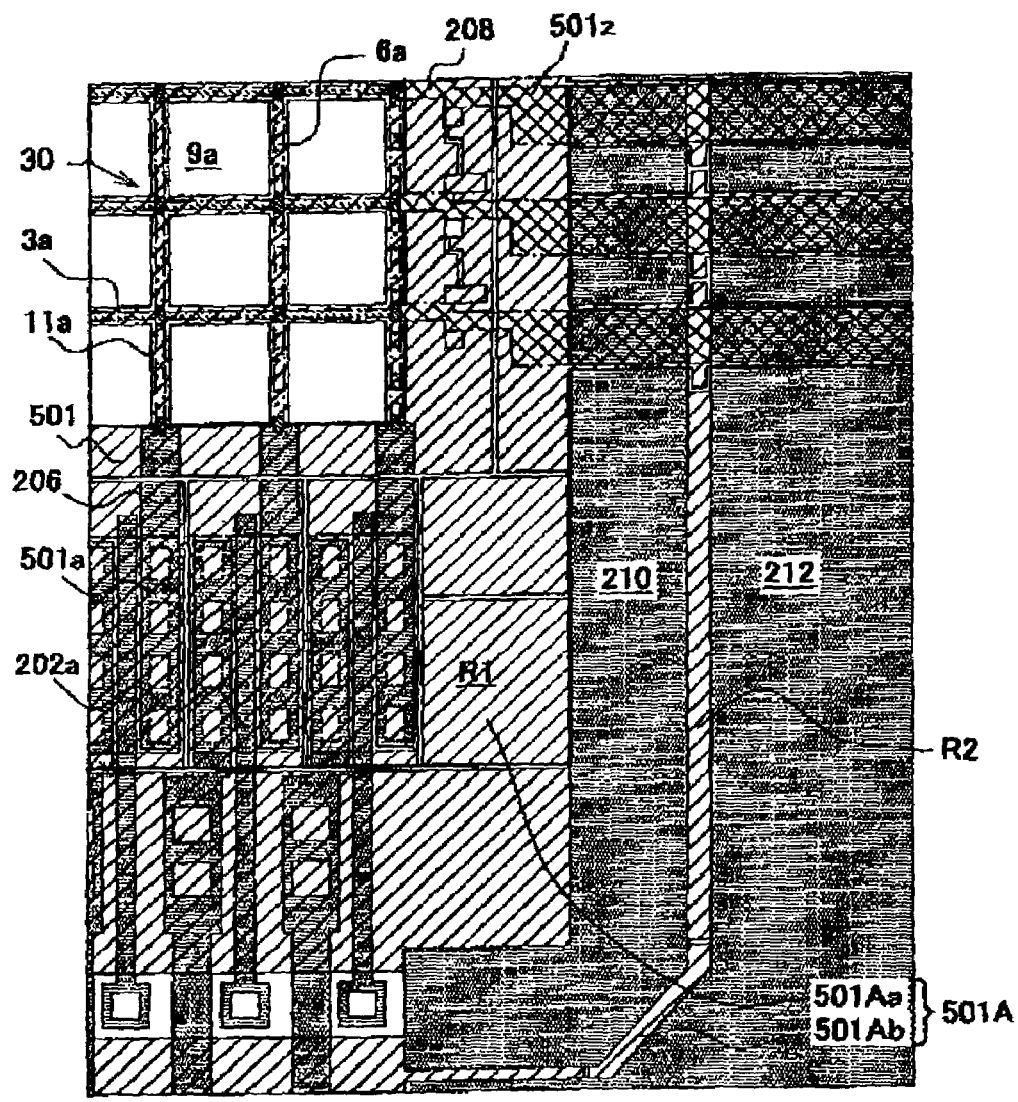
FIG. 18 is an enlarged plan view showing a portion in a sixth embodiment of the present invention, which corresponds to the vicinity of the portion denoted by character A in FIG. 1.
Figure 19:
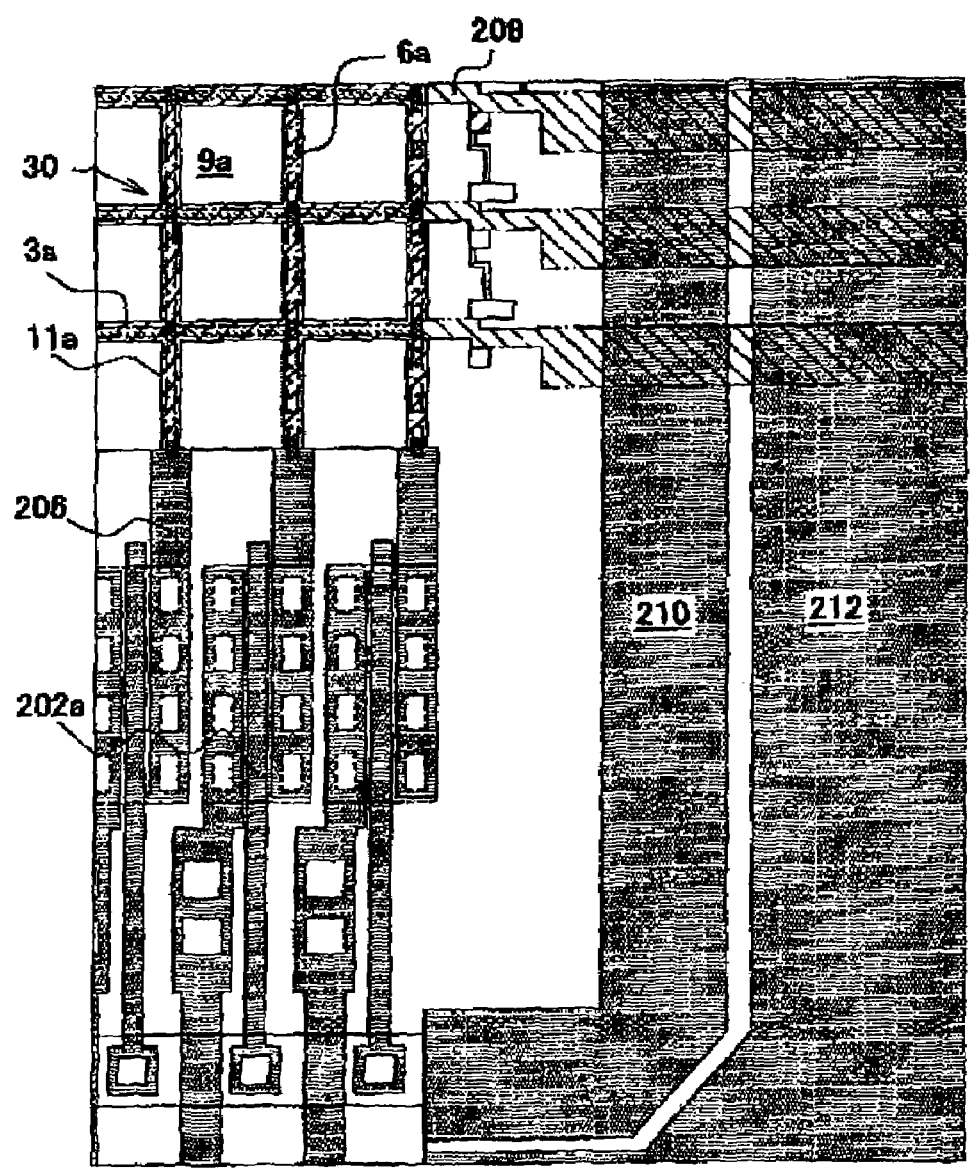
FIG. 19 is an enlarged plan view showing a portion in a related art example, which corresponds to the vicinity of the portion denoted by character A in FIG. 1.
Figure 20:
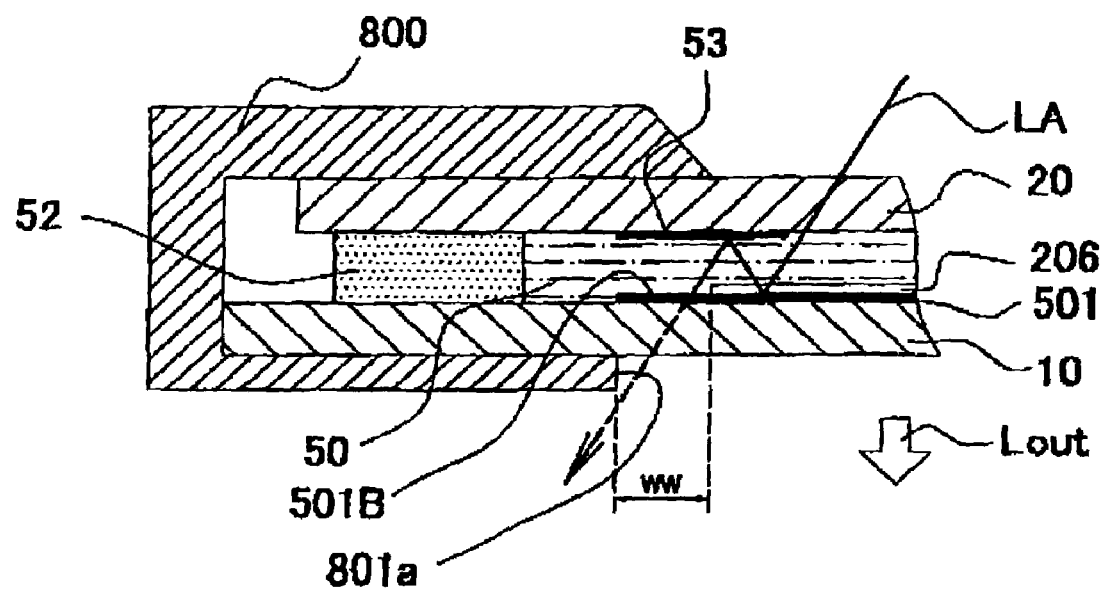
FIG. 20 is an enlarged sectional view showing a portion in the sixth embodiment of the present invention, which corresponds to the vicinity of the portion denoted by character CR in FIG. 2.

An electro-optical device according to a sixth embodiment of the present invention will be described with reference to FIGS. 18 to 20. FIG. 18 is an enlarged plan view of a portion in the sixth embodiment, which corresponds to the portion A shown in FIG. 1, and FIG. 19 is an enlarged plan view of a portion in a comparative example, which corresponds to the portion A shown in FIG. 1. FIG. 20 is an enlarged sectional view of a portion in the sixth embodiment, which corresponds to the portion CR shown in FIG. 2.

In FIGS. 18 to 20, the same components as the first embodiment shown in FIGS. 1 to 9 and the second embodiment shown in FIGS. 10 and 11 are denoted by the same reference numerals, and a description thereof is omitted.

In FIG. 18, as described above in the first embodiment, the lead wirings 206 of the data lines 6a are formed on the TFT array substrate 10, and TFTs 202a constituting the sample circuit 301 described above with reference to FIG. 3 are respectively connected to ends of the lead wirings 206. Furthermore, in FIG. 18, lead wirings 208 (corresponding to an example of the "pattern portion" of the present invention) of the scanning lies 3a are formed. A scanning line driving circuit (refer to FIG. 1) is connected to the extended end (not shown in FIG. 18) of the lead wirings 208. Also, in FIG. 18, various wirings 210 and 212 are formed to supply a predetermined potential to the counter electrode on the counter substrate 20 (refer to the vertical conductive materials 106 shown in FIG. 1). Furthermore, like in the above embodiments, the lower shielding films 501 and 501a are formed to decrease the number of the lead wirings 206a or the TFTs 202a and to partially cover the TFT array substrate 10 sides thereof (refer to FIGS. 4 to 6 or FIGS. 10 and 11). The winnings 210 and 121 correspond to an example of a "second pattern portion" in the sixth embodiment.

Particularly, in the sixth embodiment, besides the lower shielding films 501 and 501a, a lower shielding film 11a (refer to FIG. 9) is formed to cover the TFT array substrate 10 sides of the TFTs 30 serving as the pixel switching elements formed in the image display region 10a, and an out-of-region shielding film 501A is formed to cover the entire peripheral region around the image display region 10a. All the three types of the shielding films are simultaneously formed as the same film in a manufacturing step.

Of these shielding films, the structure of the out-of-region shielding film 501A is described in detail below with reference to FIG. 18.

The lower shielding film 501 is formed to cover the lead wirings 206, as shown in the upper left portion of FIG. 18 (refer to FIG. 4 or 6). The lower shielding film 501a is formed to cover the TFTs 202a constituting the sample circuit 301 as shown in a middle portion of FIG. 18 (refer to FIG. 10 or 11). In addition, in FIG. 18, a lower shielding film 501a is provided to cover the lead wirings 208 led from the scanning lines 3a. These shielding films have the same purpose and exhibit the same function as the lower shielding film in the above embodiments.

The out-of-region shielding film 501A of the sixth embodiment includes a second lower shielding film 501Aa formed in the region R1 other than the region in which the lower shielding films 501a and 501a are formed, integrally with the lower shielding films 501a and 501a. Namely, the second lower shielding film 501Aa is formed in the region R1 other than the region in which the lead wirings 206 or the TFTs 202a are formed, in the frame region (shown by the thick lines in FIG. 18). Furthermore, the out-of-region shielding film 501A includes a true out-to-region shielding film 501Ab formed between the wirings 210 and 212 provided in the region R of the frame region. The true out-of-region shielding film 501Ab may be not formed below the wirings 210 and 212. Namely, the true out-of-region shielding film 501Ab is divided.

In brief, in the sixth embodiment, the out-of-regions shielding film 501A is formed to cover almost the entire region of the TFT array substrate 10 except in some cases in which the out-of-region shielding film 501A is not formed in the region in which the wirings or the circuit elements are formed, as the wirings 210 or 212.

As shown in FIG. 18, slits are formed at appropriate positions of the out-of-region shielding film 501A. Namely, the out-of-region shielding film 501A is divided into islands. In the sixth embodiment, the distance between the islands of the out-of-region shielding film 501A is set to 2 μm or less. The out-of-region shielding film 501A having such as shape can be easily formed by proper patterning.

The out-of-region shielding film 501A has the following function: In the comparative example shown in FIG. 19 in which the out-of-region shielding film 501A of the sixth embodiment is not formed, the portion of the TFT away substrate 10, which corresponds to the out-of-region shielding film 501A, is exposed (of course, the various interlayer insulating films 12, 41, 42 and 43 are formed). Therefore, incident light possibly passes "directly" through that portion, and is possibly mixed with light $L_{out}$ (refer to FIG. 4 or 6) to form a display image to affect the image display. For example, when the above-described return light passes through the region R1, is reflected by the frame shielding film 53, and again passes through the region R1, the light is highly likely to be mixed with the light $L_{out}$ for forming the display image, thereby possibly causing a dim light image near the edge of the image.

However, in the sixth embodiment, as described above, the out-of-region shielding film 501A including the second lower shielding film 501Aa and the true out-of-region shielding film 501Ab is formed in the regions R1 and R2, thereby preventing or substantially preventing the above phenomenon. Therefore, in the sixth embodiment, it is possible to prevent or to substantially prevent the occurrence of a dim light image near the edge of the display image, and display a higher-quality image with a good appearance.

In the sixth embodiment, the out-of-region shielding film 501A is divided as described above, or the true out-of-region shielding film 501Ab formed between the wirings 210 and 212 is divided into large parts according to place. Therefore, the internal stress can be relatively decreased, as compared with a case in which such a shielding film is formed over the entire region. It is thus possible to prevent or substantially prevent the phenomenon that the out-of-region shielding film 501A is broken by its own internal stress, or cracks occur in the peripheral components (for example, the underlying insulating film 12, and the like), thereby providing an electro-optical device with high reliability.

When the out-of-region shielding film 501A is divided into islands in the region R1, the distance between the islands is 2 μm or less. Therefore, light passing through the spaces between the islands is unlikely to again pass through the spaces after being reflected by the frame shielding film 53 at the back of the out-of-region shielding film 501A. Consequently, the light is highly unlikely to be mixed with the light $L_{out}$ for forming the display image, thereby significantly decreasing the influence of the spaces on the display image. Therefore, in the sixth embodiment, it is possible to obtain the initial effect of the out-of-region shielding film 501A, i.e., the function to prevent or to substantially prevent the occurrence of a light image around the display image, while obtaining the function of the island-formed shielding film 501A, i.e., the function to decrease internal stress.

Although, in the sixth embodiment, the out-of-region shielding film 501A is formed to cover almost the entire surface of the TFT array substrate, the out-of-region shielding film 501A is not necessarily formed over the entire surface of the TFT away substrate 10 form the viewpoint of the present invention. In fact, in FIGS. 18 and 19, the out-of-region shielding film 501A is divided at an appropriate position, and it is thus apparent that the out-of-region shielding film 501A is not necessarily formed over the entire region of the TFT array substrate 10.

More specifically, for example, the out-of-region shielding film of the present invention may be formed only in the portion WW shown in FIG. 20. In FIG. 20, the portion WW is positioned between the edge 801a of the display window formed in the mounting case and the edge of the lower shielding film 501. This is because traveling of light is cut off by the mounting case 801 in the portions other than the portion WW, and it is thus thought that the "direct" passage of light substantially occurs only in the portion WW. It is thus sufficient that the out-of-region shielding film is formed only in the portion WW (refer to reference numeral 501B or traveling of light LA).

In this embodiment, light shielding can be effectively realized, and the occurrence of the problem due to the internal stress of the out-of-region shielding film 501B shown in FIG. 20 can be reduced or suppressed because the out-of-region shielding film 501B is formed in an appropriate necessary area.

Since the electro-optical device of each of the embodiments is applied to a projector, three electro-optical devices are respectively used as RGB light values, and color lights, which are produced by separation through RGB color separation dichroic mirrors, are respectively incident as incident lights on the light valves. In each of the embodiments, a color filter is not provided on the counter substrate 20. However, in the counter substrate 20, a RGB color filter may be formed in predetermined regions facing the pixel electrodes 9a together with a protective film. In this case, besides the projector, the electro-optical device of each of the embodiments can be applied to a direct viewing or reflective color electro-optical device. Alternatively, a microlens may be formed on the counter substrate 20 corresponding to each of the pixels. A color filter layer may be formed, by using color resist, below the pixel electrodes 9a facing the RGB colors formed on the TFT array substrate 10. In this case, the efficiency of convergence of incident light can be enhanced to realize a bright electro-optical device. Furthermore, interference layers having different refractive indexes may be deposited on the counter substrate 20 to form a dichroic filter for making the RGB colors by using interference of light. By using the counter substrate with the dichroic filter, a brighter color electro-optical device can be realized.

(Electronic Apparatus According to Embodiment)

Figure 21:
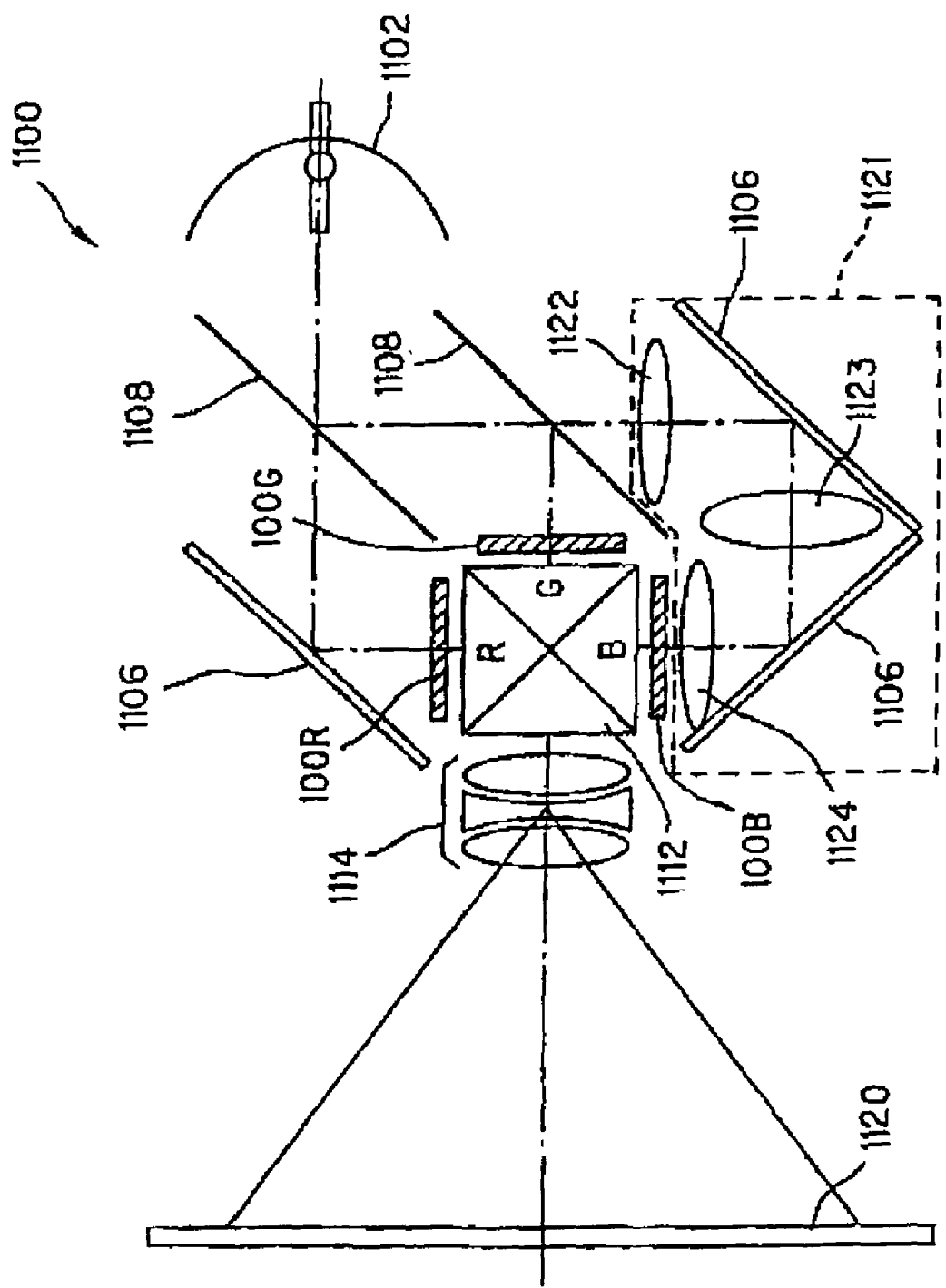
FIG. 21 is a schematic sectional view showing a color liquid crystal projector as an example of a projection color display device according to an embodiment of the present invention.

The whole construction, particularly the optical construction, of a projection color display device is described as an example of an electronic apparatus using one of the above-described electro-optical devices as a light valve according to an embodiment of the present invention. FIG. 21 is a schematic sectional view of a projection color display device.

In FIG. 21, a liquid crystal projector 1100 as an example of the projection color display device of this embodiment includes three liquid crystal modules each including a liquid crystal device in which driving circuits are mounted on a TFT array substrate, the modules being respectively used as RGB light valves 100R, 100G and 100B. In the liquid crystal projector 1100, when incident light is emitted from a lamp unit 1102 of a while light source, such as a metal halide lamp or the like, the incident light is separated into light components R, G and B corresponding to the three primary colors RGB by three mirrors 1106 and two dichroic mirrors 1108, and these light components are respectively introduced into the light valves 100R, 100G and 100B corresponding to the respective colors. Particularly, B light is introduced through a relay lens system 1121 including an incidence lens 1122, a relay lens 1123 and an emission lens 1124 in order to prevent or substantially prevent a light loss due to a long optical path. Then, the light components corresponding to the primary colors are modulated by the light valves 100R, 100G and 100B, again combined by a dichroic prism 1112, and projected as a color image on a screen 1120 through a projector lens 1114.

The electro-optical device of the present invention can also be applied to an electrophoretic device, an EL device, etc.

The present invention is not limited to the above embodiments, and appropriate modification can be made within the scope of the gist and idea of the present invention, which can be found from the claims and the specification. The technical field of the present invention also include an electro-optical device and an electronic apparatus according to modified embodiments.

What is claimed is:

1. An electro-optical device, comprising:
   a substrate;
   a frame shielding film disposed in a periphery of an image display region, so that the frame shielding film defines the image display region;
   a display line disposed in the image display region of the substrate;
   a pixel switching element electrically connected to the display line;
   a pattern portion including a wiring connected to the display line through the pixel switching element, provided between the substrate and the frame shielding film and disposed in a frame region of the frame shielding film;
   a first set of one or more lower shielding films provided between the pattern portion and the substrate, the first set of one or more lower shielding films overlapping the pattern portion in the frame region of the frame shielding film; and
   a second set of one or more additional lower shielding films separate from the first set of one or more lower shielding films, including the same film which is formed by the same layer as the first set of one or more lower shielding films and formed in and overlapping in plan view the frame region of the frame shielding film except in the region when the pattern portion is formed.

2. The electro-optical device according to claim 1, the second lower shielding film including a plurality of shielding films.

3. The electro-optical device according to claim 2, wherein the distance between the adjacent second lower shielding films is 4 μm or less.

4. The electro-optical device according to claim 1, further comprising a mounting case to mount the electro-optical device, the mounting case having a display window corresponding to the image display region,
   the second lower shielding film being formed in at least a portion of the region between the edge of the display window and the edge of the image display region.

5. The electro-optical device according to claim 1, the frame shielding film including aluminum.

6. An electro-optical device comprising:
   a substrate;
   a frame shielding film disposed in a periphery of an image display region, so that the frame shielding film defines the image display region;
   a display line disposed in the image display region of the substrate;
   a pixel switching element electrically connected to the display line;
   a pattern portion including a circuit element connected to the display line through the pixel switching element, provided between the substrate and the frame shielding film and disposed in a frame region of the frame shielding film;
   a first set of one or more lower shielding films provided between the pattern portion and the substrate, the first set of one or more lower shielding films overlapping the pattern portion in the frame region of the frame shielding film; and
   a second set of one or more additional lower shielding films separate from the first set of one or more lower shielding films, including the same film which is formed by the same layer as the first set of one or more lower shielding films and formed in and overlapping in plan view the frame region of the frame shielding film except in the region where the pattern portion is formed.

7. The electro-optical device according to claim 6, the second lower shielding film including a plurality of shielding films.

8. The electro-optical device according to claim 7, wherein the distance between adjacent lower shielding films is 4 μm or less.

9. The electro-optical device according to claim 6, further comprising a mounting case to mount the electro-optical device, the mounting case having a display window corresponding to the image display region,
   the second lower shielding film being formed in at least a portion of the region between the edge of the display window and the edge of the image display region.

10. The electro-optical device according to claim 6, the frame shielding film including aluminum.

* * * * *